United States Patent
Yoshida et al.

(10) Patent No.: US 7,683,109 B2
(45) Date of Patent: Mar. 23, 2010

(54) CONDUCTIVE COMPOSITION AND PRODUCTION METHOD THEREOF, ANTISTATIC COATING MATERIAL, ANTISTATIC COATING, ANTISTATIC FILM, OPTICAL FILTER, AND OPTICAL INFORMATION RECORDING MEDIUM, AND CAPACITORS AND PRODUCTION METHOD THEREOF

(75) Inventors: Kazuyoshi Yoshida, Kazo (JP); Tailu Ning, Saitama (JP); Yasushi Masahiro, Saitama (JP)

(73) Assignee: Shin-Etsu Polymer Co., Ltd. (JP)

( * ) Notice: Subject to any disclaimer, the term of this patent is extended or adjusted under 35 U.S.C. 154(b) by 1087 days.

(21) Appl. No.: 11/231,689

(22) Filed: Sep. 21, 2005

(65) Prior Publication Data
US 2006/0062958 A1 Mar. 23, 2006

(30) Foreign Application Priority Data

Sep. 22, 2004 (JP) ............................. 2004-274992
Nov. 22, 2004 (JP) ............................. 2004-337468
Dec. 1, 2004 (JP) ............................. 2004-348684

(51) Int. Cl.
*H01G 9/00* (2006.01)
(52) U.S. Cl. ....................... 523/523; 361/525; 361/528; 361/529; 361/516; 361/519
(58) Field of Classification Search ................ 361/523, 361/525–529, 516–519, 321.4, 321.5, 540–541, 361/503–504, 508–512; 252/500; 29/25.01, 29/25.03
See application file for complete search history.

(56) References Cited

U.S. PATENT DOCUMENTS 5,002,699 A * 3/1991 Jenekhe et al. .............. 252/500

(Continued)

FOREIGN PATENT DOCUMENTS

EP 0 358 188 3/1990

(Continued)

OTHER PUBLICATIONS

"Fine Chemical Antistatic Agents Latest Market Trend (the first volume)," vol. 16, No. 15, 1987, p. 24-36, published by CMC.

(Continued)

*Primary Examiner*—Nguyen T Ha
(74) *Attorney, Agent, or Firm*—Ostrolenk Faber LLP

(57) ABSTRACT

A conductive composition comprises a π conjugated conductive polymer, a dopant composed of polyanion, and at least one crosslinking site forming compound selected from (a) compounds having a glycidyl group and (b) compounds having a hydroxyl group and one selected from the group consisting of allyl, vinyl ether, methacryl, acryl methacrylamide, and acrylamide groups. An antistatic coating material comprises a π conjugated conductive polymer, polyanion, at least one crosslinking site forming compound selected form the above (a) and (b), and a solvent. An antistatic coating is formed by applying the above-mentioned antistatic coating material. In a capacitor comprising an anode composed of a valve metal porous body; a dielectric layer formed by oxidizing the suds of the anode; and a cathode formed on the dielectric layer, the cathode has a solid electrolyte layer formed by crosslinking complexes of a π conjugated conductive polymer and a dopant composed of a polyanion.

4 Claims, 2 Drawing Sheets

U.S. PATENT DOCUMENTS

| | | | |
|---|---|---|---|
| 5,061,401 A | | 10/1991 | Wernet et al. |
| 5,068,060 A | * | 11/1991 | Jen et al. .................... 252/500 |
| RE34,514 E | * | 1/1994 | Wernet et al. ............... 252/500 |
| 5,324,463 A | | 6/1994 | Wernet et al. |
| 6,190,805 B1 | * | 2/2001 | Takeuchi et al. ............ 429/307 |
| 7,154,739 B2 | * | 12/2006 | O'Phelan .................... 361/508 |
| 7,167,353 B2 | * | 1/2007 | Yuyama et al. ............. 361/502 |
| 7,385,802 B1 | * | 6/2008 | Ribble et al. ................ 361/508 |
| 7,529,076 B2 | * | 5/2009 | Saito et al. ................ 361/301.5 |

FOREIGN PATENT DOCUMENTS

| | | |
|---|---|---|
| EP | 0 844 284 | 5/1998 |
| EP | 1 634 922 | 3/2006 |
| JP | 63-158829 | 7/1988 |
| JP | 63-173313 | 7/1988 |
| JP | 11-74157 | 7/1989 |
| JP | 1-254764 | 10/1989 |
| JP | 5-186619 | 7/1993 |
| JP | 7-090060 | 4/1995 |
| JP | 7-105718 | 4/1995 |
| JP | 7 105718 | 4/1995 |
| JP | 7-238149 | 9/1995 |
| JP | 2546617 | 8/1996 |
| JP | 2546617 | 10/1996 |
| JP | 2636968 | 4/1997 |
| JP | 2636968 | 8/1997 |
| JP | 10-101936 | 4/1998 |
| JP | 11-74157 | 3/1999 |
| JP | 11-186110 | 7/1999 |
| JP | 2001-135551 | 5/2001 |
| JP | 2002-60736 | 2/2002 |
| JP | 2002-89543 | 3/2002 |
| JP | 2002-275261 | 9/2002 |
| JP | 2003-37024 | 2/2003 |
| JP | 2005-39276 | 2/2005 |
| JP | 2005-146259 | 6/2005 |
| JP | 2005-170996 | 6/2005 |
| WO | WO 98/25274 | 6/1998 |
| WO | WO 2004-113441 | 12/2004 |

OTHER PUBLICATIONS

"Fine Chemical Antistatic Agents Latest Market Trend (first volume)," published by CMC Publishing Co., Ltd., vol. 16, No. 15, 1987, pp. 24-36 (with English translation of relevant parts).

Corresponding International Patent Application No. PCT/JP2005/017472 Search Report and Written Opinion dated Dec. 27, 2005.

Supplemental Search Report from the European Patent Office in corresponding European patent application 05785490.3 with a mail date of Jul. 13, 2009 (5 pages).

* cited by examiner

CONDUCTIVE COMPOSITION AND PRODUCTION METHOD THEREOF, ANTISTATIC COATING MATERIAL, ANTISTATIC COATING, ANTISTATIC FILM, OPTICAL FILTER, AND OPTICAL INFORMATION RECORDING MEDIUM, AND CAPACITORS AND PRODUCTION METHOD THEREOF

BACKGROUND OF THE INVENTION

1. Field of the Invention

The present invention relates to a conductive composition and production method thereof. The present invention further relates to an antistatic coating material for imparting antistatic properties to a film, an antistatic coating material having antistatic properties, an antistatic film used in wrapping materials of food and electronic parts, an optical filter used for the front surface of a liquid crystal display and a plasma display, and an optical information recording medium, such as CDs and DVDs. The present invention relates to capacitors such as an aluminum electrolytic capacitor, tantalum electrolytic capacitor, and niobium electrolytic capacitor and a production method thereof.

The present invention claims priority on Japanese Patent Application No. 2004-274992, filed on Sep. 22, 2004, Japanese Patent Application No. 2004-337468, filed on Nov. 22, 2004, and Japanese Patent Application No. 2004-348684, filed on Dec. 1, 2004, the contents of which are incorporated herein by reference.

2. Description of Related Art

In recent years, conductive polymers in which electron-donating compounds or electron accepting compounds (dopants) are added (doped) to conductive polymers such as polypyrrole, polythiophene, polyacetylene, poly phenylene, and polyaniline have been developed.

Two types of doping, i.e., p-type doping wherein an electron-donating compound (oxidant) is doped to generate numerous holes in a conductive polymer and the holes are made conductive as carriers and an n-type doping wherein an electron-donating compound (reductant) is doped to generate numerous electrons in a conductive polymer and the electrons are made conductive as carriers.

The above conductive polymers are usually prepared by an electrolytic polymerization method or a chemical oxidative polymerization method.

The electrolytic polymerization method is a process wherein a mixed solution of an electrolyte as dopant and a monomer which can form a conductive polymer is electrolytically polymerized on an electrode to form a conductive polymer into a film on the electrode. This electrolytic polymerization method is difficult to prepare the conductive polymer in large quantities because the monomer is polymerized on the electrode, in addition, the obtained film has low solvent solubility making it difficult to use in the industry.

In contrast, the chemical oxidative polymerization method is not restricted as is the electrolytic polymerization method. Namely, a large quantity of conductive polymer can be obtained in a solution by adding an appropriate oxidant and an appropriate oxidative polymerization catalyst to a monomer which can form a conductive polymer. However, in the chemical oxidative polymerization method, the solubility for solvents decreases with the growth of main chain of conductive polymer; therefore, the polymer is obtained in an insoluble solid powder in many cases. It is difficult to form a uniform conductive film on a base with the insolubility in solvents.

A solubilization made by inducing a functional group into a conductive polymer and a solubilization made by dispersion in a binder resin, and solubilization using an anion-containing polymeric acid, and the like have been attempted. However, it was difficult to ensue high electric conductivity, compatibility with a binder resin, and heat stability in these methods.

A method wherein a conducting layer is provided on a base surface by dissolving an oxidant and a monomer forming a conductive polymer with a vinyl chloride copolymer in a solvent and applying it to the base surface, and polymerizing the monomer to form a complex of a vinyl chloride copolymer and a conductive polymer while controlling the oxidation potential with a solvent has been proposed as a method for forming a conducting layer on a base provided on a solid surface of polymer molding (see Japanese Unexamined Patent Application, First Publication No. 5-186619).

However, in the method described in Japanese Unexamined Patent Application, First Publication No. 5-186619, the polymerization of monomer by oxidation potential control is restricted due to the fact that a solvent is limited according to the kind of base; therefore, high electric conductivity cannot be ensured. Containing a vinyl chloride copolymer as an insulative rein also becomes a reason why high electric conductivity cannot be ensured.

Moreover, a method wherein 3,4-dialkoxythiophene is polymerized by chemical oxidation to produce a poly(3,4-dialkoxythiophene) solution with an oxidant in the presence of polystyrene sulfonic acid having a molecular weight of 2000 to 500000 has been proposed for the purpose of improving the dispersibility of an conductive polymer in water (see Japanese Patent Publication No. 2636968).

However, in the method described in Japanese Patent Publication No. 2636968, a conductive polymer can be easily dispersed in water, but it contains more polymeric acid having an anion group to improve the water dispersibility of the conductive polymer in this method. Therefore, there is the problem that high electric conductivity is hard to obtain.

Furthermore, a preparation method that a sulfonated substance usable as antioxidant and a compound having an analogous structure, which are as a dopant and a heat stabilizer, are mixed with a monomer, and then, electrolytically polymerized for the purpose of increasing the heat stability of a conductive polymer has been proposed (see Japanese Patent Publication No. 2546617).

However, the method described in Japanese Patent Publication No. 2546617 has the problem that heat stability is obtained but solvent solubility is hard to obtain.

In some cases, $\pi$ conjugated conductive polymers are used as an organic material which has a conductive mechanism of electronic conduction.

Resin films themselves are insulators and easily electrically charged. Furthermore, resin films tend to charge static electricity by friction or the like. Moreover, static electricity is not easily removed, but rather accumulates causing various problems.

Particularly, when a resin film is used for food packaging material emphasizing sanitary properties, dust and dirt are absorbed in display, the appearance is significantly impaired and in some cases the commodity value is lowered. When resin film is used for packaging a powder, charged powder is absorbed or repulsed in its packaging or use, and therefore causes the inconvenience that handling of the powder becomes difficult. When a precision electronic part is packaged with a resin film, it is a feared that the precision electronic part is damaged by the static electricity; therefore, the occurrence of static electricity must always be prevented.

Moreover, it is desirable that the surface of an optical filter or an optical information recording medium has high hardness and high transparency as well as antistatic properties to prevent the adherence of dust and dirt due to the sic electricity. Particularly, it is desired that the surface resistance of the antistatic property be in the region of about $10^6$ to $10^{10} \Omega$ and that the resistance stabilizes (i.e., stabilized antistatic properties), from which antistatic coating having antistatic properties and high hardness is provided on the surface of optical filter or optical information recording medium.

In order to impart antistatic properties, for example, a method for coating a resin film or a surfactant on the surface and a method for kneading a surfactant into a resin forming a resin film or an antistatic coating have been adopted (for example, see "Fine Chemical Antistatic Agents Latest Market Trend (the first volume)," Vol. 16, No. 15, 1987, p. 24-36, published by CMC).

However, electrostatic peon based on this surfactant has the drawback that its conduction mechanism is one of ion conduction, therefore, it is easily affected by humidity, conductivity increases by high humidity; however, conductivity decreases by low humidity. Therefore, the antistatic function deteriorates and antistatic performance is not displayed as necessary in an environment where the humidity is low, and especially static electricity easily occurs.

If a metal or carbon with electron conduction as conduction mechanism is used, such humidity dependence disappears, but these materials are totally opaque and not applicable for purposes requiring the transparency.

Moreover, a metal oxide such as ITO (Indium Tin Oxide) has transparency and adopts the electron conduction as a conduction mechanism; therefore, it is suited in this respect, but a process using a sputtering apparatus must used for its film-forming. Not only is the process complicated but also the manufacturing cost rises. A coating film of inorganic metal oxide has low flexibility. When a film is formed on a thin base film, the coating film may be broken and does not exhibit conductivity. In addition, it is feared that peeling occurs at the interface and the transparency reduces because the adhesion to the base being an organic substance is low.

Moreover, $\pi$ conjugated conductive polymers are known as organic materials with electron conduction as the conduction mechanism, but the $\pi$ conjugated conductive polymers generally have insoluble and infusible properties, and it is difficult to coat the polymers on a base film after polymerization. Accordingly, it has been attempted that aniline be polymerized in the presence of a polymeric acid with a sulfo group to form a water-soluble polyaniline, the obtained mixture is used, coated on a base film and then dried (e.g., see Japanese Unexamined Patent Application, First Publication No. 1-254764).

However, as with the method described in Japanese Unexamined Patent Application, First Publication No. 1-254764, if aniline is directly polymerized on a base, an antistatic coating can be formed. In this case, the antistatic coating has low conductivity because the coating is not obtained by a $\pi$ conjugated conductive homopolymer, and the adhesion to a resin base is low and manufacturing processes are also complicated because the antistatic coating is water-soluble.

Capacitors are given as example of using $\pi$ conjugated conductive polymers.

In recent years, it has been required to reduce the impedance of capacitors used for electronics in a high-frequency region with the digitalization of electronics. A so-called functional capacitor in which an oxide film of valve metals such as aluminum, tantalum, and niobium is adopted as a dielectric and a $\pi$ conjugated conductive polymer is formed on this surface and used as a cathode and thus far has been used in response to this requirement.

As shown in Japanese Unexamined Patent Application, First Publication No. 2003-37024, it is general that the structure of this functional capacitor has an anode consisting of a valve metal porous body, a dielectric layer formed by oxidizing the surface of anode, and a cathode obtained by laminating a solid electrolyte layer, a carbon layer and a silver layer on the dielectric layer. The solid electrolyte layer of the capacitor is a layer constructed from a $\pi$ conjugated conductive polymer of pyrrole, thiophene, and the like, and the layer performs to penetrate into the inside of porous body, come into contact with a larger area of electrolyte layer to derive a high capacity, restore defects of the dielectric layer, and prevent leakage of a current.

An electrolytic polymerization method (see Japanese Unexamined Patent Application, First Publication No. 63-158829) and a chemical oxidative polymerization method (see Japanese Unexamined Patent Application, First Publication No. 63-173313) have been widely known as methods for forming the $\pi$ conjugated conductive polymers.

However, the electrolytic polymerization method has the problem that a conductive layer made of manganese oxide must be formed on the surface of the valve metal porous body beforehand, the process is complicated, and further the manganese oxide has low conductivity and weakens the effect of using the $\pi$ conjugated conductive polymers having high conductivity.

The chemical oxidative polymerization method has the problem that the polymerization time is long, the polymerization must be repeated to ensue the thickness, the production efficiency of capacitors is low and the conductivity is also low.

Accordingly, a method wherein conductive polymers are not formed by the electrolytic polymerization method and the chemical oxidative polymerization method (see Japanese Unexamined Patent Application, First Publication No. 7-105718) has been proposed. A method wherein aniline is polymerized while allowing a polymeric acid with a sulfo group or carboxyl group to coexist to form a water-soluble polyaniline, the aqueous solution of polyaniline is coated on a base film and then dried has been described in Japanese Unexamined Patent Application, First Publication No. 7-105718. This preparation method is simple, but the permeability for the inside of porous body of the polyaniline solution deteriorates, the conductivity is low because the polymeric acid is contained except for the $\pi$ conjugated conductive polymer and the humidity dependence on conductivity is also found by the effect of polymeric acid.

A capacitor having a low equivalent series resistance (ESR) as index of impedance has been desired, and the conductivity of the solid electrolyte layer must be incased to decrease ESR. As a method for increasing the conductivity of the solid electrolyte layer, for example, it has been proposed to highly control conditions for the chemical oxidative polymerization method (see Japanese Unexamined Patent Application, First Publication No. 11-74157). However, in the production method, the complex chemical oxidative polymerization method is more complicated in many cases, thus the simplification and low costing of processes cannot be realized.

SUMMARY OF THE INVENTION

The first object of the present invention is to provide a conductive composition excellent in all of electric conductivity, solvent solubility and heat stability and production method thereof. The second object of the present invention is to provide an antistatic coating material which can form an antistatic coating having high conductivity, flexibility, and adhesion to base, an antistatic coating which can be prepared by a simple production method of coating, and an antistatic film, an optical filter, and an optical information recording medium which all have excellent antistatic property. Furthermore, the third object of the present invention is to provide a capacitor having excellent conductivity of solid electrolyte layer of cathode and a low ESR, and a method of producing the capacitor in a simple manner.

A conductive composition of the present invention, comprises: a π conjugated conductive polymer, a dopant composed of a polyanion, and at least onecrosslinking site forming compound selected from the following (a) and (b).

A production method of conductive composition of the present invention comprises the steps of: forming complexes which combine a π conjugated conductive polymer and a dopant composed of a polyanion, and adding at least one-crosslinking site forming compound selected from the following (a) and (b) to the complexes.

(a) Compounds having a glycidyl group.
(b) Compounds having a hydroxyl group and one selected from the group consisting of allyl, vinyl ether, methacryl, acryl, methacrylamide, and acrylamide groups.

An antistatic coating material of the present invention, comprises a π conjugated conductive polymer, a polyanion, at least one crosslinking site forming compound selected from the following (a) and (b), and a solvent.

(a) Compounds having a glycidyl group.
(b) Compounds having a hydroxyl group and one selected from the group consisting of allyl, vinyl ether, methacryl, acryl, methacrylamide, and acrylamide groups.

The antistatic coating material of the present invention may further comprise a dopant.

The antistatic coating material of the present invention may further comprise a binder resin.

When the antistatic coating material of the present invention comprises a binder resin, the binder resin may be one or more resins selected from the group consisting of polyurethane, polyester, acrylic resin, polyamide, polyimide, epoxy resin, polyimide silicone, and melamine resin.

An antistatic coating of the present invention is formed by applying the above-mentioned antistatic coating material.

An antistatic film of the present invention comprises a film base and the above-mentioned antistatic coating formed on at least one side of the film base.

An optical filter of the present invention comprises the above-mentioned antistatic coating.

An optical information recording medium of the present invention comprises the above-mentioned antistatic coating.

A capacitor of the present invention comprises an anode composed of a valve metal porous body, a dielectric layer formed by oxidizing the surface of the anode, and a cathode formed on the dielectric layer, wherein the cathode has a solid electrolyte layer formed by crosslinking complexes of a π conjugated conductive polymer and a dopant composed of a polyanion.

In the capacitor of the present invention, the cathode may comprise an electrolyte.

A production method of a capacitor of the present invention, comprises the steps of: applying a conductive polymer solution, which comprises a π conjugated conductive polymer, a dopant composed of a polyanion, at least one crosslinking site forming compound selected from the following (a) and (b), and a solvent, to the surface of a dielectric layer in a capacitor intermediate, which comprises an anode composed of a valve metal porous body and the dielectric layer formed by oxidizing the surface of the anode, and drying the coated conductive polymer solution.

(a) Compounds having a glycidyl group.
(b) Compounds having a hydroxyl group and one selected from the group consisting of allyl, vinyl ether, methacryl, acryl, meth acrylamide, acrylamide groups.

The conductive composition of the present invention is excellent in all of conductivity, solvent solubility, and heat resistance as well as excellent in film formability and abrasion resistance.

The production method of the conductive composition of the present invention enables to obtain the conductive composition excellent in all of conductivity, solvent solubility, and heat resistance as well as excellent in film formability and abrasion resistance.

The antistatic coating material of the present invention enables to form the antistatic coating having high conductivity, flexibility, and adhesion to base by coating. Moreover, such an antistatic coating material enables to produce the antistatic coating at a low cost because a sufficient antistatic property can be displayed by using it in a small amount.

If the antistatic coating material further contains a dopant, the conductivity of antistatic coating can be further increased and the heat resistance is also improved.

If a binder resin is contained, the adhesion to base can be further increased.

Particularly, when the binder rein is one or more resins selected from the group consisting of polyurethane, polyester, acrylic resin, polyamide, epoxy resin, polyimide silicone, and melamine resin, it is easily mixed with essential ingredients of the antistatic coating material.

The antistatic coating material of the present invention has high conductivity, flexibility, and adhesion to base, and can be produced by a simple production method of coating.

The antistatic film, optical filter, and optical information recording medium are excellent in antistatic property, and prevent the occurrence of static electricity.

The capacitor of the present invention has a low equivalent series resistance because the conductivity of cathode is high.

In the capacitor of the present invention, if an electrolyte is contained in the cathode, the rate of deriving an electrostatic capacity increases.

The production method of the capacitor of the present invention enables to simply produce the capacitor having a high conductivity of cathode and a low equivalent series resistance.

DETAILED DESCRIPTION OF THE INVENTION

π Conjugated Conductive Polymer

Figure 1:
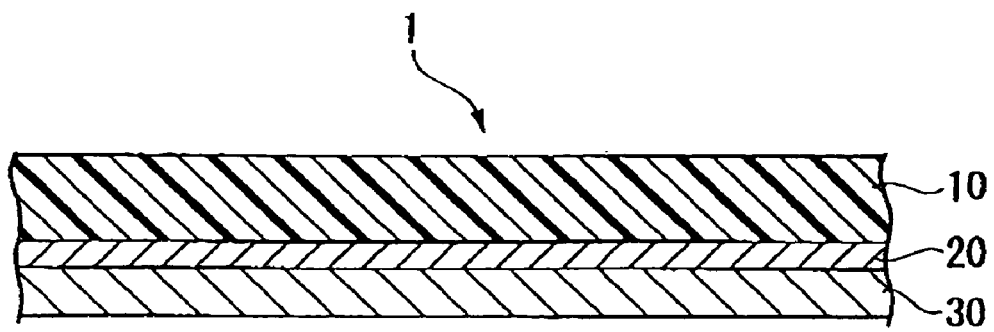
FIG. 1 is a cross-sectional view showing an embodiment of the optical filter according to the present invention.

The π conjugated conductive polymers can be used if they are organic polymers in which the main chain is constructed by a π conjugate system Examples of the polymer include polypyrroles, polythiophens, polyacetylenes, polyphenylenes, polyphenylene vinylenes, polyanilines, polyacenes, polythiophene vinylenes, and copolymers thereof. Polypyrroles, polythiophens, and polyanilines are preferable from in view of ease of polymerization and stability in the air.

The π conjugated conductive polymers can be obtained sufficient conductivity and compatibility for binder resins as they are unsubstituted, but it is preferable that functional groups such as alkyl, carboxyl, sulfo, alkoxy, hydroxyl, and cyano groups are introduce into the π conjugated conductive polymers to increase the conductivity and dispersibility or solubility for binder resins.

Examples of the π conjugated conductive polymer specifically include polypyrrole, poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), poly(N-methylpyrrole), polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), poly(3-anilinesulfonic acid), and the like.

Among these polymers, a (co)polymer composed of one or two compounds selected from polypyrrole, polythiophene, poly(N-methylpyrrol), poly(3-methylthiophene), poly(3,4-ethylenedioxythiophene) is suitably used in view of resistance value and reactivity. Polypyrrole and poly(3,4-ethylenedioxythiophene) are more preferable in view of increasing the conductivity and improving the heat resin.

Moreover, alkyl-substituted compounds such as poly(N-methylpyrrol) and poly(3-methylthiophene) are more preferable because the solvent solubility, compatibility for binder resins, and dispersibility are improved. In the alkyl groups, methyl group is preferable because it does not exert an adverse effect on the conductivity. Furthermore, poly(3,4-ethylenedioxythiophene) doped with polystyrene sulfonate (abbreviated as PEDOT-PSS) is preferable in that the transparency after forming the coating film becomes favorable because it has higher heat stability and low degree of polymerization.

A (co)polymer composed of one or two compounds selected from substituted or unsubstituted polypyrroles and substituted or unsubstituted polythiophenes can be used as π conjugated conductive polymers contained in the conductive composition. A (co)polymer composed of one or two selected from polypyrrole, polythiophene, poly(N-methylpyrrole), poly(3-methylthiophene), poly(3-methoxythiophene), and poly(3,4-ethylenedioxythiophene) are more preferable.

The above π conjugated conductive polymers can be easily produced by chemical oxidative polymerization of precursor monomers forming π conjugated conductive polymers in the presence of an appropriate oxidant, an oxidation catalyst, and a polyanion dopant described later. The chemical oxidative polymerization may be carried out in a solvent.

(Precursor Monomers)

A precursor monomer has a π-conjugate system in a molecule and forms the π-conjugate system in the main chain when it is polymerized by the function of an appropriate oxidant. Examples of the precursor monomers include pyrroles and their derivatives, thiophenes and their derivatives, anilines and their derivatives, and the like.

Specific examples of the precursor monomers include pyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxypyrrole, 3-methyl-4-carboxypyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole, N-methylpyrrole, thiophene, 3-methyl-thiophene, 3-ethylthiophene, 3-propylthiophene, 3-butylthiophene, 3-hexylthiophene, 3-heptylthiophene, 3-octylthiophene, 3-decylthiophene, 3 dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butenedioxythiophene, 3-methyl-4-methoxythiophene, 3-methyl-4-ethoxythiophene, 3-carboxythiophene, 3-methyl-4-carboxythiphene, 3-methyl-4-carboxyethylthiphene, 3-methyl-4-oxybutylthiphene, aniline, 2-methylaniline, 3-isobutylaniline, 2-anilinesulfonic acid, 3-anilinesulfonic acid, and the like.

(Solvents)

As solvents used in the preparation of π conjugated conductive polymers, they are not specially limited and may be solvents which are able to dissolve or disperse the precursor monomers and keep the oxidizing power of oxidants and oxidation catalysts. For example, polar solvents such as water N-methyl-2-pyrrolidone, N,N-dimethylformamide, N,N-dimethylacetamide, dimethylsulfoxide, hexamethylene phosphortriamide, acetonitrile, benzonitrile, hexamethylphosphoric triamide, 1,3-dimethyl-2-imidazolidine, dimethylimidazoline, ethyl acetate, sulforan, diphenyl sulfone, and the like; phenols such as cresol, phenol, xylenol, and the like; alcohols such as methanol, ethanol, propanol, butanol, and the like; ketones such as acetone, methyl ethyl ketone, hydrocarbons such as hexane, benzene, toluene, and the like;

carboxylic acids such as formic acid, acetic acid, and the like; carbonate compounds such as ethylene carbonate, propylene carbonate, and the like; ether compounds such as dioxane, diethyl ether, and the like, chain ethers such as ethylene glycol dialkyl ethers, propylene glycol dialkyl ethers, and the like; heterocyclic compounds such as 3-methyl-2-oxazolidinone, nitrile compounds such as acetonitrile, glutarodinitrile, methoxyacetonitrile, propionitrile, benzonitrile, and the like are given. These solvents may be used individually, as mixtures of two or more of them, or as mixtures with other organic solvents.

(Oxidants and Acid Catalysts)

Oxidants and oxidation catalysts may be ones which are able to oxidize the precursor monomers to give the π conjugated conductive polymers. Examples of them include peroxodisulfates such as ammonium peroxodisulfate, sodium peroxodisulfate, potassium peroxodisulfate, and the like; transition metal compounds such as ferric chloride, ferric sulfate, ferric nitrate, cupric chloride, and the like; metal halide compounds such as boron trifluoride, aluminum chloride, and the like; metal oxides such as silver oxide, cesium oxide, and the like; peroxides such as hydrogen peroxide, ozone, and the like; organic peroxides such as benzoyl peroxide, and the like; oxygen, and the like.

Examples of oxidants used for polymerizing monomers in the chemical oxidative polymerization include metal halide compounds such as ferric chloride, boron trifluoride, aluminum chloride, and the like; peroxides such as hydrogen peroxide, benzoyl peroxide, and the like; persulfates such as potassium persulfate, sodium persulfate, ammonium persulfate, and the like; ozone, oxygen, cerium sulfite, and the like.

(Polyanion Dopants)

A dopant composed of a polyanion having an anion group in a molecule is hereinafter called a polyanion dopant.

This dopant is a solubilizing polymer to solubilize a π conjugated conductive polymer in a solvent. Anion groups of polyanion function as a dopant for the π conjugated conductive polymer and improve conductivity and heat resistance of the π conjugated conductive polymer. For example, the polyanion dopant is doped to a π conjugated conductive polymer by chemical oxidation to form a salt as a complex. Moreover, at least a part of residual anion groups which do not form a salt with the π conjugated conductive polymer react with a crosslinking site forming compound as described later.

For example, the polyanions are substituted or unsubstituted polyalkylenes, substituted or unsubstituted polyalkylenes, substituted or unsubstituted polyimides, substituted or unsubstituted polyamides, and substituted or unsubstituted polyesters, and polymers composed of structure units only having anion groups and polymers composed of structure units having no anion groups are given as the polyanions.

Polyalkylenes are polymers in which the main chain is constructed by repeated methylenes. Examples of polyalkylenes include polyethylene, polypropylene, polybutene, polypentene, polyhexene, polyvinyl alcohol, polyvinyl phenol, poly3,3,3-trifluoropropylene, polyacrylonitrile, polyacrylate, polystyrene, and the like.

Polyalkenylenes are polymers composed of structural in which one or more unsaturated bonds (vinyl groups) are contained in the main chain. Specific examples of polyalkenylenes include polymers comprising one or more structural units selected from propenylene, 1-methylpropenylene, 1-butylpropenylene, 1-decylpropenylene, 1-cyanopropenylene, 1-phenylpropenylene, 1-hydroxypropenylene, 1-butenylene, 1-methyl-1-butenylene, 1-ethyl-1-butenylene, 1-octyl-1-butenylene, 1-pentadecyl-1-butenylene, 2-methyl-1-butenylene, 2 ethyl-1-butenylene, 2-butyl-1-butenylene, 2-hexyl-1-butenylene, 2-octyl-1-butenylene, 2-decyl-1-butenylene, 2-dodecyl-1-butenylene, 2-phenyl-1-butenylene, 2-butenylene, 1-methyl-2-butenylene, 1-ethyl-2-butenylene, 1-octyl-2-butenylene, 1-pentadecyl-2-butenylene, 2-methyl-2-butenylene, 2-ethyl-2-butenylene, 2-butyl-2-butenylene, 2-hexyl-2-butenylene, 2-octyl-2-butenylene, 2-decyl-2-butenylene, 2-dodecyl-2-butenylene, 2-phenyl-2-butenylene, 2-propylenephenyl-2-butenylene, 3-methyl-2-butenylene, 3-ethyl-2-butenylene, 3-butyl-2-butenylene, 3-hexyl-2-butenylene, 3-ethyl-2-butenylene, 3-ethyl-2-butenylene, 3-dodecyl-2-butenylene, 3-phenyl-2-butenylene, 3-propylene-phenyl-2-butenylene, 2-pentenylene, 4-propyl-2-pentenylene, 4-butyl-2-pentenylene, 4-hexyl-2-pentenylene, 4-cyano-2-pentenylene, 3-methyl-2-pentenylene, 4-ethyl-2-pentenylene, 3-phenyl-2-pentenylene, 4-hydroxy-2-pentenylene, hexenylene, and the like.

In these polymers, substituted or unsubstituted butenylens are preferable from the fact that an interaction between an unsaturated bond and a π conjugated conductive polymer exists and substituted or unsubstituted butadienes are easily synthesized as starting materials.

Examples of polyimdes include polyimides from anhydrides such as pyromellitic dianhydride, biphenyltetracarboxylic dianhydride, benzophenone tetracarboxylic dianhydride, 2,2,3,3-tetracarboxyphenyl ether dianhydride, and 2,2-[4,4'-di(dicarboxyphenyloxy)phenyl]propane dianhydride; and diamines such as oxydiamine, p-phenylenediamine, m-phenylenediamine, and benzophenonediamine.

Examples of polyamides include polyamide 6, polyamide 6, 6, polyamide 6, 10, and the like.

Examples of polyesters include polyethylene terephthalate, polybutylene terephthalate, and the like.

When polyanions have substituents, examples of substituents include alkyl hydroxyl, amino, carboxyl, cyano, phenyl, phenol, ester, alkoxyl groups, and the like. If solubility for solvents, heat resistance, and compatibility with resins are considered, alkyl, hydroxyl, phenol and ester groups are preferable.

Alkyl groups can increase solubility for and dispersibility in polar solvents or nonpolar solvents, and compatibility with and dispersibility in resins. Hydroxyl groups can easily form a hydrogen bond with another hydrogen atom and increase solubility for organic solvents and compatibility with, dispersibility for, and adhesion to resins. Moreover, cyano and hydroxyphenyl groups can increase compatibility with and solubility for polar resins and also increase heat resistance.

In the above substituents, alkyl, hydroxyl, ester, and cyano groups are preferable.

Examples of the alkyl groups include chain alkyl groups such as methyl, ethyl, propyl, butyl, isobutyl, t-butyl, pentyl, hexyl, octyl, decyl, and dodecyl groups; and cycloalkyl groups such as cyclopropyl, cyclopentyl, and cyclohexyl groups. If solubility for solvents, dispersibility in resins, steric hindrance, and the like are considered, $C_1$ to $C_{12}$ alkyl groups are more preferable.

Examples of the hydroxyl groups include hydroxyl groups directly bonded to the main chain of polyanions or hydroxyl groups bonded to the main chain via other functional groups. Examples of the other functional groups include $C_1$ to $C_7$ alkyl groups, $C_2$ to $C_7$ alkenyl groups, amide groups, imide groups, and the like. The hydroxyl groups are substituted at the end or in these functional groups. In these groups, hydroxyl groups bonded at the end of $C_1$ to $C_6$ alkyl groups are more preferable in view of compatibility with resins and solubility for organic solvents.

Examples of the amino groups include amino groups directly bonded to the main chain of polyanions or amino group bonded to the main chain via other functional groups. Examples of the other functional groups include $C_1$ to $C_7$ alkyl groups, $C_2$ to $C_7$ alkenyl groups, amide groups, imide groups, and the like. The amino groups are substituted at the end or in these functional groups.

Examples of the phenol groups, phenol groups directly bonded to the main chain of polyanions or phenol group bonded to the main chain via other functional groups. Examples of the other functional groups include $C_1$ to $C_7$ allyl groups, $C_2$ to $C_7$ alkenyl groups, amide groups, imide groups, and the like. The phenol groups are substituted at the end or in these functional groups.

Examples of the ester groups include alkyl ester groups or aromatic ester groups directly bonded to the main chain of polyanions or alkyl ester groups or aromatic ester groups bonded to the main chain via other functional groups.

Examples of the cyano groups include cyano groups directly bonded to the main chain of polyanions or cyano groups bonded to the end of $C_1$ to $C_7$ alkyl groups bonded to the main chain, cyano groups bonded the end of $C_2$ to $C_7$ alkenyl groups to the main chain, and the like.

As anion groups of polyanion dopant, they are preferably functional groups which cause the chemical oxidation doping to π conjugated conductive polymers and are able to bond a protonic acid of anion groups to any of vinyl, glycidyl, or hydroxyl group. More specifically, sulfuric acid group, phosphoric acid group, sulfo group, carboxyl group, phospho group, mono-substituted phosphate group, and the like are preferable, and sulfo group, carboxyl group, mono-substituted phosphate group, and the like are more preferable in view of doping effect of functional groups to π conjugated conductive polymers.

Specific examples of polyanions having a sulfo group include polyvinyl sulfonic acid, polystyrene sulfonic acid, polyallyl sulfonic acid, polyethyl acrylate sulfonic acid, polybutyl acrylate sulfonic acid, polyacryl sulfonic acid, polymethacryl sulfonic acid, poly-2-acrylamide-2-methylpropane sulfonic acid, polyisoprene sulfonic acid, and the like. These polyanions may be homopolymers or copolymers of two or more of them.

Specific examples of polyanions having a carboxyl group include polyvinyl carboxylic acid, polystyrene carboxylic acid, polyallyl carboxylic acid, polyacryl carboxylic acid, polymer carboxylic acid, poly-2-acrylamide-2-methylpropane carboxylic acid, polyisoprene carboxylic acid, polyacrylic acid, and tee like. These polyanions may be homopolymers or copolymers of two or more of them.

Among these polyanions, polystyrene sulfonic acid, polyisoprene sulfonic acid, polyethyl acrylate sulfonic acid, polybutyl acrylate sulfonic acid are preferable from effects of increasing compatibility with binder resins, further increasing conductivity of resultant antistatic coating material, and suppressing thermal decomposition of the π conjugated conductive polymers.

The degree of polymerization of polyanions is preferably in a range of 10 to 10000 monomer units, more preferably in a range of 50 to 10000 monomer units in view of solvent solubility and conductivity.

Examples of production methods of polyanions include a method wherein an anion group is directly introduced into a polymer free of an anion group with an acid, a method wherein a polymer free of an anion group is sulfonated with a sulfonating agent, and a method wherein a polymer is produced by polymerization of an anion group containing polymerizable monomer.

As the method wherein a polymer is produced by polymerization of an anion group containing polymerizable monomer, a method wherein an anion group containing polymerizable monomer is produced by oxidative polymerization or radical polymerization in a solvent in the presence of an oxidant and/or a polymerization catalyst. Specifically, a predetermined amount of an anion group containing polymerizable monomer is dissolved in a solvent, kept to a certain temper a solution obtained by dissolving predetermined amounts of an oxidant and/or a polymerization catalyst in a solvent beforehand is added thereto and then the mixture is reacted for a predetermined time. A polymer obtained by this reaction is adjusted to a certain concentration with a solvent. In this preparation method, a polymerizable monomer free of an anion group may also be copolymerized with an anion group contain polymerizable monomer.

The oxidants, oxidation catalysts, and solvents to be used in the polymerization of an anion group containing polymerizable monomers are same as those used in the polymerization of precursor monomers forming the π conjugated conductive polymers.

When the obtained polymers are polyanion salts, they are preferably modified into polyanionic acids. As methods for modifying the polymers into polyanionic acids, ion-exchange method using an ion-exchange resin, dialysis method, ultrafiltration method, and the like are given, and the ultrafiltration method is preferable in view of easy operation.

A part of the anion group containing polymerizable monomers is substituted by a mono-substituted sulfite group, a carboxyl group, sulfo group, and the like. Examples of anion group containing polymerizable monomers include a substituted or unsubstituted ethylenesulfonic acid compound, a substituted or unsubstituted styrene sulfonic acid compound, a substituted or unsubstituted acrylate sulfonic acid compound, a substituted or unsubstituted methacrylate sulfonic acid compound, a substituted or unsubstituted acrylamide sulfonic acid compound, a substituted or unsubstituted cyclovinylene sulfonic acid compound, a substituted or unsubstituted butadiene sulfonic acid compound, and a substituted or unsubstituted vinyl aromatic sulfonic acid compound.

Specific examples include vinyl sulfonic acid and salts thereof, allyl sulfonic acid and salts thereof; methallylsulfonic acid and salts therefore, styrene sulfonic acid, methallyloxy benzene sulfonic acid and salts thereof; allyloxy benzene sulfonic acid and salts thereof, α-methylstyrenesulfonic acid and salts thereof; acrylamide-t-butyl sulfonic acid and salts thereof, 2-acrylamide-2-methylpropane sulfonic acid and salts thereof, 2-acrylamide-2-methylpropane sulfonic acid and salts thereof, cyclobutene-3-sulfonic acid and salts thereof, isoprene sulfonic acid and salts thereof, 1,3-butadiene-1-sulfonic acid and salts thereof, 1-methyl-1,3-butadiene-2-sulfonic acid and salts thereof, 1-methyl-1,3-butadiene-4-sulfonic acid and salts thereof, ethyl acrylate sulfonic acid ($CH_2CH-COO-(CH_2)_2-SO_3H$) and salts thereof, propyl acrylate sulfonic acid ($CH_2CH-COO-(CH_2)_3SO_3H$) and salts thereof, t-butyl acrylate sulfonic acid ($CH_2CH-COO-C(CH_3)_2-SO_3H$) and salts thereof, n-butyl acrylate sulfonic acid ($CH_2CH-COO-(CH_2)_4-SO_3H$) and salts thereof; ethyl vinylacetate sulfonic acid ($CH_2CHCH_2-COO-(CH_2)_2-SO_3H$) and salts thereof, t-butyl vinylacetate sulfonic acid ($CH_2CH(CH_2)_2-COO-C(CH_3)_2CH_2-SO_3H$) and salts thereof, ethyl 4-pentenoate sulfonic acid ($CH_2CH(CH_2)_2-COO-(CH_2)_2-SO_3H$) and salts thereof, propyl 4-pentenoate sulfonic acid ($CH_2CH(CH_2)_2-COO-(CH_2)_3-SO_3H$) and salts thereof, n-butyl 4-pentenoate sulfonic acid ($CH_2CH-CH_2)_2COO-(CH_2)_4-SO_3$) and salts thereof, t-butyl 4-pentenoate sulfonic acid ($CH_2CH(CH_2)-COO-C(CH_3)_2-CH_2-SO_3H$) and salts thereof; phenylene 4-pentenoate sulfonic acid (CH$_2$CH(CH$_2$)$_2$—COO—C$_6$H$_4$—SO$_3$H) and salts thereof, naphthalene 4-pentenoate sulfonic acid (CH$_2$CH (CH$_2$)$_2$—COO—C$_{10}$H$_8$—SO$_3$H) and salts thereof, ethyl methacrylate sulfonic acid (CH$_2$C(CH$_3$)—COO—(CH$_2$)—SO$_3$H) and salts thereof, propyl methacrylate sulfonic acid (CH$_2$C(CH$_3$)—COO—(CH$_2$)$_3$—SO$_3$ and salts thereof, t-butyl methacrylate sulfonic acid (CH$_2$C(CH$_3$)COO—C(CH$_3$)$_2$CH$_2$—SO$_3$H) and salts thereof, n-butyl methacrylate sulfonic acid (CH$_2$C(CH$_3$)COO—(CH)$_4$SO$_3$H and salts thereof, phenylene methacrylate sulfonic acid (CH$_2$C (CH$_3$)—COO—(CH)$_4$—SO$_3$ and salts thereof, naphthalene methacrylate sulfonic acid (CH$_2$C(CH$_3$)—COO—C$_6$H$_4$—SO$_3$H) and salt thereof, polyvinyl carboxylic acid, polystyrene carboxylic acid, polyallyl carboxylic acid, polyacryl carboxylic acid, polymethacryl carboxylic acid, poly-2-acrylamide-2-methylpropanecarboxylic acid, polyisoprene carboxylic acid, polyacrylic acid, and the like. The polyanions may also be copolymers containing two or more of them.

Examples of polymerizable monomers free of an anion group include ethylene, propene, 1-butene, 2-butene, 1-pentene, 2-pentene, 1-hexene, 2-hexene, styrene, p-methylstyrene, p-ethylstyrene, p-butylstyrene, 2,4,6-trimethylstyrene, p-methoxystyrene, α-methylstyrene, 2-vinylnaphthalene, 6-methyl-2-vinylnaphthalene, 1-vinylimidazole, vinylpyridine, vinyl acetate acrylaldehyde, acrylonitrile, N-vinyl-2-pyrrolidone, N-vinylacetamide, N-vinylformamide, N-vinylimidazole, acrylamide, N,N-dimethylacrylamide, acrylic acid, methyl acrylate, ethyl acrylate, propyl acrylate, n-butyl acrylate, i-butyl acrylate, t-butyl acrylate, i-octyl acrylate, i-nonylbutyl acrylate, lauryl acrylate, allyl acrylate, stearyl acrylate, i-bonyl acrylate, cyclohexyl acrylate, benzyl acrylate, ethylcarbitol acrylate, phenoxyethyl acrylate, hydroxyethyl acrylate, methoxyethyl acrylate, ethoxyethyl acrylate, methoxybutyl acrylate, methacrylic acid, methyl methacrylate, ethyl methacrylate, n-butyl methacrylate, i-butyl methacrylate, t-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, acryloylmorpholine, vinylamine, N,N-dimethylvinylamine, N,N-diethylvinylamine, N,N-dibutylvinylamine, N,N-di-t-butylvinylamine, N,N-diphenylvinylamine, N-vinylcarbazole, vinyl alcohol, vinyl chloride, vinyl fluoride, methyl vinyl ether, ethyl vinyl ether, cyclopropene, cyclobutene, cyclopentene, cyclohexene, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene, 2-hydroxy-1,3-butadiene, and the like.

The solvent solubility and compatibility with binder resins can be controlled by copolymerizing these polymerizable monomers free of an anion group.

(Crosslinking Site Forming Compounds)

Crosslinking site forming compounds are at least one compound selected from the following (a) and (b).

(a) Compounds having a glycidyl group hereinafter called compounds (a)).

(b) Compounds having a hydroxyl group and one selected from the group consisting of allyl, vinyl ether group, methacryl, acryl, methacrylamide, acrylamide groups (hereinafter, called compounds (b)).

Moreover, the following compounds of (a-1) to (a-3) are given as compounds (a).

(a-1): Compounds having one glycidyl group and one selected from the group consisting of allyl, vinyl ether group, methacryl acryl, methacrylamide, and acrylamide groups (hereinafter, called compounds (a-1)).

(a-2): Compounds having two or more glycidyl groups (hereinafter, called compounds (a-2)).

(a-3): Compounds having one glycidyl group other than compounds (a-1) (hereinafter, called compounds (a-3)).

Glycidyl acrylate, glycidyl methacrylate, and the like are given as compounds having a glycidyl group and an acryl (methacryl) group in compounds (a-1).

Allyl glycidyl ether, 2-methylallyl glycidyl ether, allylphenol glycidyl ether, and the like are given as compounds having a glycidyl group and an allyl group.

1,4-dihydroxymethylbenzene diglycidyl ether, glycerin diglycidyl ether, and the like are given as compounds having a glycidyl group and a hydroxyl group.

3-allyl-1,4-dihydroxymethylbenzene diglycidyl ether, and the like are given as compounds having a glycidyl group, a hydroxyl group, and an allyl group.

The compounds having a glycidyl group and a hydroxyl group and the compounds having a glycidyl group, a hydroxyl group and an allyl group are also compounds (b).

Examples of compounds (a-2) include ethylene glycol diglycidyl ether, diethylene glycol diglycidyl ether, 1,6-hexanediol diglycidyl ether, trimethylolpropane triglycidyl ether, bisphenol A diglycidyl ether, polyethylene glycol diglycidyl ether, propylene glycol diglycidyl ether, polypropylene glycol diglycidyl ether, neopentyl glycol diglycidyl ether, diglycidyl dimerate, diglycidyl phthalate, triglycidyl isocyanate, tetraglycidyl diaminodiphenyl metahne, diglycidyl teraphthalate, and the like. The compounds can be used as mixtures of one or two or more of them.

Examples of compounds (a-3) include alkyl glycidyl ether, ethylene glycol diglycidyl ether, methyl glycidyl ether, phenyl glycidyl ether, butyl glycidyl ether, cresyl glycidyl ether, and the like.

Examples of compounds having a glycidyl group and a hydroxyl group in compounds (b) include 2-hydroxyethyl vinyl ether, 4-hydroxybutyl vinyl ether, diethylene glycol monovinyl ether, and the like.

Examples of compounds having a hydroxyl group and an acryl (methacryl) group include 2-hydroxyethyl acrylate (methacrylate), 2-hydroxypropyl acrylate (methacrylate) 4-hydroxybutyl acrylate (methacrylate), ethyl-α-hydroxymethyl acrylate, dipentaerythritol monohydroxypentacrylate, and the like.

Examples of compounds having a hydroxyl group and an acrylamide (methacrylamide) group include 2-hydroxyethyl acrylamide, 2-hydroxyethyl methacrylamide, and the like.

In an above compound (a), its glycidyl group reacts with a residual anion group (e.g., sulfo group, carboxyl group, and the like) of a polyanion dopant to form an ester (e.g., sulfonic ester, carboxylic ester, and the like). During the reaction, it may be accelerated by a basic catalyst, applied pressure or heating. In the ester formation, the glycidyl group opens to form a hydroxyl group. This hydroxyl group undergoes a dehydration reaction with the residual polyanion group that did not form a salt or an ester with a conductive polymer to newly form an ester (e.g., sulfonic acid ester, carboxylic acid ester, and the like). Complexes of the polyanion dopant and the conductive polymer crosslink with each other by such an ester formation.

Moreover, in the compound (a-1), a residual anion group of a polyanion dopant and a glycidyl group of compound (a-1) combines, and then allyl, vinylether, methacryl, acryl methacrylamide, acrylamide groups polymerize with each other and the complexes further crosslink with each other.

Moreover, in an above compound (b), its hydroxyl group undergoes a dehydration reaction with a residual anion group of a polyanion dopant to form an ester. During the dehydration, it may be accelerated by an acid catalyst. Subsequently, allyl, vinylether group, methacryl, acryl, methylacrylamide, acrylamide groups polymerize with each other. Complexes of the polyanion dopant and the conductive polymer crosslink with each other by this polymerization.

Radical polymerization method, heat polymerization method, radical photopolymerization method, and plasma polymerization method are applicable in the polymerization of methacrylate, acrylate, acrylamide, methacrylamide, allyl groups in the compounds (a-1) and compounds (b).

In the radical polymerization method, for example, azo compounds such as azobisisobutyronitrile, and the like, peroxides such as benzoyl peroxide, diacylperoxides, peroxy esters, hydroperoxides, and the like are used as polymerization initiators to polymerize.

In the radical photopolymerization method, carbonyl compounds, sulfur compounds, organic peroxides, azo compounds, and the like are used as polymerization initiators to polymerize. Specific examples include benzophenone, Michler's ketone, xanthone, thioxanthone, 2-ethylanthraquinone, acetophenone, trichloroacetophenone, 2-hydroxy-2-methylpropiophenone, 1-hydroxycyclohexyl phenyl ketone, bezoin ether, 2,2-diethoxyacetophenone, 2,2-dimethoxy-2-phenylacetophenon, benzyl, methylbenzoyl formate, 1-phenyl-1,2-propanedione-2-(o-benzoyl)oxime, 2,4,6-trimethylbenzoyldiphenyl phosphine oxide, tetramethylthiuram, dithiocarbamate, benzoyl peroxide, N-laurylpyridium azide, polymethylphenyl silane, and the like.

In the plasma polymerization method, a polymer is formed by irradiating plasma for a short time and subjecting to energy due to an electron impact to make a fragmentation and a rearrangement and then recombination of radicals.

A cationic polymerization method is also adopted in the polymerization of vinyl ether groups in the compounds (a-1) and compounds (a-2). In the cationic polymerization, Lewis acids such as metal halides, organometallic compounds, and the like, and optionally, electrophilic reagents forming cations by light or heat, such as halogen, strong acid salts, carbonium ion salts, and the like may also be used.

Crosslinking site forming compounds is preferably contained in an amount of 0.1 to 100 mol eq., and more preferably 2 to 50 mol eq. to polyanion dopant. If the content of crosslinking site forming compounds to polyanion dopant is more than 100 mol eq, the crosslinking site forming compounds become excessive, and it is feared that the electric conductivity is lowered. If the content is less than 0.1 mol eq. to polyanion dopant, the electric conductivity, heat stability, film formability, abrasion resistance, base adhesion tend to be improved with difficulty.

(Dopant)

Dopants other than polyanion dopants may also be added to improve the electric conductivity and heat stability. If the oxidation-reduction potential of the π conjugated conductive polymers can be changed, the other dopants may be donors or an acceptors.

(Donor Dopant)

Examples of donor dopants include alkali metals such as sodium potassium and the like; alkali-earth metals such as calcium, magnesium, and the like; quaternary amine compounds such as tetramethylammonium, tetraethylammonium, tetrapropylammonium, tetrabutylammonium, methyltriethylammonium, dimethyldiethylammonium, and the like.

(Acceptor Dopant)

Examples of acceptor dopants include halogen compounds, Lewis acids, protonic acids, organic cyano compounds, organic metal compounds, fullerene, fullerene hydride, fullerene hydroxide, fullerene carboxylate, fullerene sulfonate, and the like.

Examples of halogen compounds include chlorine ($Cl_2$), bromine ($Br_2$), iodine ($I_2$), iodine chloride (ICl), iodine bromide (IBr), iodine fluoride (IF), and the like.

Examples of Lewis acids include $PF_5$, $AsF_5$, $SbF_5$, $BF_5$, $BCl_5$, $BBr_5$, $SO_3$, and the like.

Examples of organic cyano compounds include compounds containing two or more cyano groups in the conjugated bond such as tetracyanoethylene, tetracyanoethyleneoxide, tetracyanobenzene, dichlorodicyanobenzoquinone (DDQ), tetracyanoquinodimethane, tetracyanoazanaphthalene, and the like.

The protonic acids include inorganic acids and organic acids. Examples of inorganic acids include hydrochloric acid, sulfuric acid, nitric acid, phosphoric acid, borohydrofluoric acid, hydrofluoric acid, perchloric acid, and the like. Examples of organic acids include organic carboxylic acids, phenols, organic sulfonic acids, and the like.

The organic carboxylic acid may be those having one or more carboxy groups in the aliphatic, aromatic, or cyclic aliphatic series. Examples of organic carboxylic acid include formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitroacetic acid, triphenylacetic acid, and the like.

As organic sulfonic acids, those containing one, two or more sulfo groups in aliphatic, aromatic, and cyclic aliphatic compound or polymers containing sulfo groups can be used.

Examples of organic sulfonic acids containing one sulfo group include methanesufonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, 1-tetradecanesulfonic acid, 1-pentadecanesulfonic acid, 2-bromoethanesulfonic acid, 3-chloro-2-hydroxypropanesulfonic acid, trifluoromethanesulfonic acid, colistinmethanesulfonic acid, 2-acrylamide-2-methylpropanesulfonic acid, aminomethanesulfonic acid, 1-amino-2-naphthol-4-sulfonic acid, 2-amino-5-naphthol-7-sulfonic acid, 3-aminopropanesulfonic acid, N-cyclohexyl-3-aminopropanesulfonic acid, benzenesulfonic acid, p-toluenesulfonic acid, xylenesulfonic acid, ethylbenzenesulfonic acid, propylbenzenesulfonic acid, butylbenzenesulfonic acid, pentylbenzenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, hexadecylbenzenesulfonic acid, 2,4-dimethylbenzenesulfonic acid, dipropylbenzenesulfonic acid, butylbenzenesulfonic acid, 4-aminobenzenesulfonic acid, o-aminobenzenesulfonic acid, m-aminobenzenesulfonic acid, 4-amino-2-chrolotoluene-5-sulfonic acid, 4-amino-3-methylbenzen-1-sulfonic acid, 4-amino-5-methoxy-2-methylbenzenesulfonic acid, 2-amino-5-methylbenzene-1-sulfonic acid, 5-amino-2-methylbenzene-1-sulfonic acid, 4-amino-3-methylbenzene-1-sulfonic acid, 4-acetamide-3-chlorobenzenesulfonic acid, 4-chrolo-3-nitrobenzenesulfonic acid, p-chlorobenzenesulfonic acid, naphthalenesulfonic acid, methylnaphthalenesulfonic acid, propylnaphthalenesulfonic acid, butylnaphthalenesulfonic acid, pentylnaphtalenesulfonic acid, dimethylnaphthalenesulfonic acid, 4-amino-1-naphthalenesulfonic acid, 8-chloronaphthalene-1-sulfonic acid, naphthalenesulfonic acid formalin condensation polymer, melaminesulfonic acid formalin condensation polymer, anthraquinonesulfonic acid, pyrenesulfonic acid, and the like. Furthermore, metal salts thereof can also be used.

Examples of organic sulfonic acids containing two or more sulfo groups include ethanedisulfonic acid, butanedisulfonic acid, pentanedisulfonic acid, decanedisulfonic acid, o-benzenesulfonic acid, m-benzenedisulfonic acid, p-benzenedisulfonic acid, toluenedisulfonic acid, xylenedisulfonic acid, chlorobenzenedisulfonic acid, fluorobenzenedisulfonic acid, dimethylbenzenedisulfonic acid, diethylbenzenedisulfonic acid, aniline-2,4-disulfonic acid, aniline-2,5-disulfonic acid, 3,4-dihydroxy-1,3-benzene disulfonic acid, naphthalenedisulfonic acid, methylnaphthalenedisulfonic acid, ethylnaphthalenedisulfonic acid, pentadecylnaphthalenedisulfonic acid, 3-amino-5-hydroxy-2,7-naphthalenedisulfonic acid, 1-acetoamide-8-hydroxy-3,6-naphthalenedisulfonic acid, 2-amino-1,4-benzenedisulfonic acid, 1-amino-3,8-naphthalenedisulfonic acid, 3-amino-1,5-naphthalenedisulfonic acid, 8-amino-1-naphthol-3,6-disulfonic acid, 4-amino-5-naphthol-2,7-disulfonic acid, 4-acetamide-4'-isothiocyanatostilbene-2,2'-disulfonic acid, 4-acetoamide-4'-maleimidylstilbene-2,2'-disulfonic acid, naphthalene trisulfonic acid, dinaphthylmethanedisulfonic acid, anthraquinonedisulfonic acid, anthracenesulfonic acid, and the like. Furthermore, metal salts thereof can also be used.

A polyanion dopant is doped to the above-described π conjugated conductive polymer to form a salt, residual anion groups of the polyanion dopant which did not used in the formation of salt react with a crosslinking site forming compound. Then, complexes of the polyanion dopant and conductive polymer crosslink with each other by ester formation or polymerization via crosslinking sites formed by the read. The intermolecular distance of complexes from each other becomes short and the complexes arm collected due to this crosslinking; therefore, the activation energy involved in hopping in electron transition among conductive polymers reduces, thus it is considered that the electric conductivity increases (more specifically, 100 S/cm or above can be id by electric conductivity). Accordingly, the solvent solubility can be increased because the quantity of polyanions is not reduced to increase the electric conductivity. Moreover, the heat stability, film formability, and abrasion resistance are considered to improve because the molecular density increases due to crosslinking.

(Binder Resin)

It is preferable that the antistatic coating material contains a binder resin because the scratch resistance and surface hardness of a coating are increased and the adhesion with base is improved. The pencil hardness (JIS K 5400) of an antistatic coating formed from the antistatic coating material is easily made to HB or harder. Namely, the bind resin displays a function as a hard coat component.

As binder resins, they way be thermosetting resins or thermoplastic resins if they are compatible with or mixable/dispersible in the antistatic coating material. Examples of binder resins include polyesters such as polyethylene terephthalate, polybutylene terephthalate, polyethylene naphthalate, and the like; polyimides such as polyimide, polyamideimide, and the like; polyamides such as polyamide 6, polyamide 6, 6, polyamide 12, polyamide 11, and the like; fluororesins such as polyvinylidene fluoride, polyvinyl fluoride, polytetrafluoroethylene, ethylenetetrafluoroethylene copolymer, polychlorotrifluoroethylene, and the like; vinyl resins such as polyvinyl alcohol, polyvinyl ether, polyvinyl butyral polyvinyl acetate, polyvinyl chloride, and the like; epoxy resin; oxetane resin; xylene resin; aramide resin, polyimide silicone; polyurethane; polyurea; melamine resin; phenol resin; polyether, acrylic resin, and their copolymers.

These binder resins may be dissolved in organic solvents, made into solutions by imparting functional groups such as sulfo or carboxyl group to the resins, or dispersed in water by emulsification and the like.

If necessary, curing agents such as crosslinking agent, polymerization initiator, and the like, polymerization accelerator, solvent, viscosity modifier, or the like can be added.

Among these binder resins, any one or more of polyurethane, polyester, acrylic resin, polyamide, polyimide, epoxy resin, polyimide silicone, and melamine resin are preferably used because these are easy to mix. Moreover, acrylic resins are suited to such purposes as optical filter because it has high hardness and excellent transparency.

Furthermore, the acrylic resin preferably contains a heat-curable or photo-curable liquid polymer.

The heat-curable liquid polymer can be, for example, a reactive polymer or a self-crosslinkable polymer.

The reactive polymers are polymers obtained by polymerizing a monomer with a substituent such as hydroxyl, carboxyl, anhydride, oxetane, glycidyl, and amino groups. Examples of the monomers include polyfunctional alcohols such as ethylene glycol, diethylene glycol, dipropylene glycol, glycerin, and the like; carboxylic acid compounds such as malonic acid, succinic acid, glutamic acid, pimelic acid, ascorbic acid, phthalic acid, acetylsalicylic acid, adipic acid, isophthalic acid, benzoic acid, m-toluic acid, and the like; acid anhydrides such as maleic acid anhydride, phthalic acid anhydride, dodecylsuccinic anhydride, dichloromaleic anhydride, tetrachlorophthalic anhydride, tetrahydrophthalic anhydride, pyromellitic acid anhydride, and the like; oxetane compounds such as 3,3-dimethyloxetane, 3,3-dichloromethyloxetane, 3-methyl-3-hydroxymethyloxetane, azidomethylmethyloxetane, and the like; glycidyl ether compounds such as bisphenol A diglycidyl ether, bisphenol F diglycidyl ether, phenol novolac polyglycidyl ether, N,N-diglycidyl-p-aminophenol glycidyl ether, tetrabromobisphenol A diglycidyl ether, hydrogenated bisphenol A diglycidyl ether (i.e., 2,2-bis(4-glycidyloxycyclohexyl)propane) and the like; glycidyl amine compounds such as N,N-diglycidylaniline, tetraglycidyldiaminodiphenylmethane, N,N,N,N-tetraglycidyl-m-xylylenediamine triglycidyl isocyanuate, N,N-diglycidyl-5,5-dialkylhydantoin, ad the like; amine compounds such as diethylenetriamine, triethylenetetramine, dimethylaminopropylamine, N-aminoethylpiperazine, benzyldimethylamine, tris(dimethylaminomethyl)phenol, DHP30-tri(2-ethyl hexoate), metaphenylenediamine, diaminodiphenylmethane, diaminodiphenyl sulfone, dicyanodiamide, boron trifluoride, monoethylamine, methanediamine, xylenediamine, ethylmethylimidazole, and the like; glycidyl compounds based on epichlorohydrin of bisphenol A in compounds containing two or more oxime rings in a molecule or their analogs.

At least difunctional or higher crosslinking agents are used in the reactive polymers. As the crosslinking agents, for example, melamine resin, epoxy resin, metal oxides, and the like. Examples of the metal oxides include basic metallic compounds such as $Al(OH)_3$, $Al(OOC-CH_3)_2(OOCH)$, $Al(OOC-CH_3)_2$, $ZrO(OCH_3)$, $Mg(OOC-CH_3)$, $Ca(OH)_2$, $Ba(OH)_3$, and the like can be properly used.

The self-crosslinkable polymers are polymers that self-crosslink with each other by functional groups due to heating, and involve, for example, glycidyl and carboxyl groups or N-methylol and carboxy group.

The photo-curable liquid polymer may be, for example, oligomers or prepolymers such as polyester, epoxy resin, oxetane resin, polyacryl, polyurethane, polyimide, polyamide, polyamideimide, polyimide silicone, and the like.

Examples of monomer units constituting a photo-curable liquid polymer include monofunctional monomers and polyfunctional monomers of acrylates such as bisphenol A ethylene oxide modified diacrylate, dipentaerythritol hexa(penta)acrylate, dipentaerythritol monohydroxy pentacrylate, dipropylene glycol diacrylate, trimethylolpropane triacrylate, glycerin propoxytriacrylate, 4-hydroxybutyl acrylate, 1,6-hexanediol diacrylate, 2-hydroxyethyl acrylate, 2-hydroxypropyl acrylate, isobornyl acrylate, polyethylene glycol diacrylate, pentaerythritol triacrylate, tetrahydrofurfuryl acrylate, trimethylolpropane triacrylate, tripropylene glycol diacrylate, and the like; methacrylates such as tetraethylene glycol dimethacrylate, alkyl methacrylates, allyl methacrylate, 1,3-butylene glycol dimethacrylate, n-butyl methacrylate, benzyl methacrylate, cyclohexyl methacrylate, diethylene glycol dimethacrylate, 2-ethylhexyl methacrylate, glycidyl methacrylate, 1,6-hexanediol dimethacrylate, 2-hydroxyethyl methacrylate, isobornyl methacrylate, lauryl methacrylate, phenoxyethyl methacrylate, t-butyl methacrylate, tetrahydrofurfuryl methacrylate, trimethylolpropane trimethacrylate, and the like; glycidyl ethers such as allylglycidyl ether, butylglycidyl ether, higher alcohol glycidyl ether, 1,6-hexanediolglycidyl ether, phenylglycidyl ether, stearylglycidyl ether, and the like; acryl (methacryl) amides such as diacetoneacrylamide, N,N-dimethylacrylamide, dimethylaminopropylacrylamide, dimethylaminopropylmethacrylamide, methacrylamide, N-methylolacrylamide, N,N-dimethylmethacrylamide, acryloylmorpholine, N-vinylformamide, N-methylacrylamide, N-isopropylacrylamide, N-t-butylacrylamide, N-phenylacrylamide, acryloylpiperazine, 2-hydroxyethyl acrylamide, and the like; vinyl ethers such as 2-chloroethylvinyl ether, cyclohexylvinyl ether, ethylvinyl ether, hydroxybutylvinyl ether isobutylvinyl ether, triethyleneglycol vinyl ether, and the like; vinyl carboxylates such as vinyl butyrate, vinyl monochloroacetate, vinyl pivalate, and the like.

The photo-curable liquid polymer cures with a photopolymerization initiator. The photopolymerization initiator can be, for example, acetophenones, benzophenones, Michler's benzoylbenzoates, α-amyloxime esters, tetramethylthiurammonosulfides, or thioxanthones. A photosensitizer such as n-butylamine triethylamine, and tri-n-butylphosphine can be mixed.

Examples of cationic polymerization initiators include aryl diazonium salts, diaryl halonium salts, triphenyl sulfonium salts, silanol/aluminum chelate, α-sulfonyloxyketones, and the like.

(Production Method of Conductive Composition)

A production method of the conductive composition of the present invention is explained.

In the production method of the conductive composition of the present invention, first, complexes combining a π conjugated conductive polymer and a polyanion dopant are formed. In the formation of complexes, anion groups of the polyanion dopant form a salt with the π conjugated conductive polymer together with the growth of main chain of the π conjugated conductive polymer. Therefore, the main chain of π conjugated conductive polymer grows along the polyanion dopant. Accordingly, the π conjugated conductive polymer and polyanion dopant become numerous complexes forming the salt. It is considered that 1 unit of anion group to 3 units of monomer of the π conjugated conductive polymer form the salt and several π conjugated conductive polymers, in which their main chains grow short, form the salt along a polyanion dopant having long chains in these complexes.

Next, a crosslinking site forming compound is added into the complexes, residual anion groups that did not form the salt with the π conjugated conductive polymer and a glycidyl or hydroxyl group of the crosslinking site forming compound form an ester. Subsequently, a hydroxyl group formed from the glycidyl group and the residual anion group react to form an ester, or allyl, vinyl ether, methacryl, acryl, methacrylamide, acrylamide groups polymerize with each other. A crosslinking structure is formed by this esterification and polymerization, the intermolecular density rises and the intermolecular distance of complexes of the π conjugated conductive polymer and polyanion dopant from each other shortens.

As a result of shortening the intermolecular distance of complexes from each other, the hopping energy during the electron transition reduces and the electric conductivity increases, simultaneously, the heat stability increases as well as the film formability and abrasion resistance also increase.

The conducive composition of the present invention can also be produced by methods other than the above method. For example, the conductive composition of the present invention can also be obtained by adding a crosslinking site forming compound before or during the formation of complexes. However, the electric conductivity can be higher according to the production method of the conductive composition of the present invention.

(Antistatic Coating Material)

To produce an antistatic coating materials first, a polyanion is dissolved in a solvent for dissolving it, a precursor monomer of a π conjugated conductive polymer and, as necessary, a dopant are added and fully stirred and mixed. Next, an oxidant is added dropwise into the obtained mixture to advance a polymerization and obtain complexes of the polyanion and π conjugated conductive polymer. Subsequently, the oxidant, residual monomer, and byproducts are removed from the complexes to purify, and then, dissolved in an appropriate solvent. A crosslinking site forming compound and, as necessary, a dopant and a binder resin are added to obtain an antistatic coating material.

Solvents used in the antistatic coating material are not specially limited, and solvents same as those used in the production of the π conjugated conductive polymers can be used.

Purification methods are not specially limited, for example, reprecipitation method, ultrafiltration method or the like can be used. Among these, the ultrafiltration method is simple and thus preferable. The ultrafiltration method is a method wherein a liquid in a solution is permeated and filtered through a porous ultrafiltration membrane while circulating the solution on the ultrafiltration membrane. In this method, the ultrafiltration membrane is inserted to produce a differential pressure between the circulated solution and the permeated solution; therefore a part of solution at the circulated solution side penetrates to the permeated solution side and release the pressure at the circulated solution side. Particles smaller than the bore diameter of the ultrafiltration membrane and a part of dissolved ions transfer to the permeated solution side according to the penetration of this circulated solution. Therefore, these particles and dissolved ions can be removed. The employed ultrafiltration membrane can be properly selected from a range of molecular weight cut off of 1000 to 100000 depending upon diameter of removed particles and ion species.

(Antistatic Coating)

An antistatic coating is formed by applying an antistatic coating material on a base. Examples of methods for applying the antistatic coating material include dipping, comma coating, spray coating, roll coating, gravure printing, and the like. Bases are not specially limited, and resin moldings easy to cause static electricity, especially resin films such as polyester film, triacetyl cellulose (TAC) film, and the like are suitable.

After the application, the solvent is removed by heating, or the coating may be cured by heat or light. As heating methods in case of heating, for example, common methods such as hot-air heating or infrared heating can be adopted. As methods for irradiating a light in case of forming a coating film by photohardening for example, a method for irradiating ultraviolet ray from light sources such as ultrahigh-pressure mercury vapor lamp, high pressure mercury vapor lamp, low-pressure mercury vapor lamp, carbon arc, xenon arc, metal halide lamp, and the like can be adopted.

In this antistatic coating, the conductivity remarkably increases because complexes of an anion group containing solubilized polymer and a π conjugated conductive polymer are crosslinked via a crosslinking site forming compound.

More specifically, the conductivity is about 0.001 to 100 S/cm when no crosslinking site forming compound is contained, on the other hand, the conductivity is about 10 to 2000 S/cm when a crosslinking site forming compound is contained.

When the antistatic coating is used in an optical field, especially, used for an optical filter and an optical information recording medium described later, the transparency is preferably high. More specifically, the total light transmittance (JIS Z 8701) is preferably 85% or above, more preferably 90% or above, and especially preferably 96% or above.

The haze (JIS K 6714) is preferably 5% or below, more preferably 3% or below, and especially preferably 1% or below.

The surface hardness (pencil hardness) of the antistatic coating is preferably HB or harder when the antistatic coating also serves as a hard coat layer.

It is preferable that the surface resistance of the antistatic coating is properly adjusted in accordance with optical characteristics. Usually, if the surface resistance is about $1 \times 10^3 \Omega$ to $1 \times 10^{12} \Omega$, it is applicable to the antistatic purpose.

The light transmittance, haze, and surface resistance of the coating film can be adjusted by the thickness of the coating film.

Moreover, the pencil hardness (JIS S 6006) is preferably H or harder. The pencil hardness can be adjusted by the thickness of coating film.

The total light transmittance, haze, and surface resistant of the coating film can be adjusted by the thickness of the antistatic coating. It is preferable that a binder resin is not contained when a low surf resistance value is desired. However, it is preferable that a binder resin is contained to lower the cost or improve the adhesion to a base.

(Antistatic Film)

An antistatic film has a film base and the above antistatic coating formed on at least one side of the film base.

Examples of film bases include low-density polyethylene film, high-density polyethylene film, ethylene-propylene copolymer film, polypropylene film, ethylene-vinylacetate copolymer film, ethylene-methyl methacrylate copolymer film, polyethylene terephthalate (PET) film, polybutylene terephthalate (PBT) film, polyethylene naphthalate (PEN) film, polyimide film, 6-nylon film, 6,6-nylon film, polymethyl methacrylate film, polystyrene film, styrene-acrylonitrile-butadiene copolymer film, polyacrylonitrile film, cellulose triacetate (TAC) film, cellulose propionate film, polyvinyl chloride film, polyvinylidene chloride film, polyvinylidene fluoride film, polytetrafluoroethylene film, polyvinyl alcohol film, ethylene-vinyl alcohol copolymer film, polycarbonate film, polysulfone film, polyether sulfone film, polyether ether ketone film, polyphenylene oxide film, and the like.

The surface of these film bases are sally oleophilic, when an antistatic coating material dissolved in an aqueous solvent is applied, the application is difficult. Therefore, when an antistatic coating material dissolved in an aqueous solvent is applied, it is preferable to give etching treatments such as sputtering, corona discharge, flame, ultraviolet irradiation, electron ray irradiation, chemical reaction, oxidation, and the like or hydrophilic treatments such as primer coating, and the like. Moreover, the surface may also be dust removed and cleaned by solvent washing, ultrasonic washing, or the like.

(Optical Filter)

An embodiment example of an optical filter of the present invention is explained.

The optical filter of this embodiment example is shown in FIG. 1. This optical filter 1 comprises a film base 10, an antistatic coating 20 formed on the film base 10, and an antireflecting layer 30 formed on the antistatic coating 20. The antistatic coating 20 in this optical filter 1 functions as a hard coat layer.

When the optical filter 1 is provided on the surface of a display, a transparent adhesive layer is provided on the surface of the film base 10 in the optical filter 1, and the optical filter 1 and the surface of the display are pasted via the adhesive layer.

Various plastic films having transparency can be used as the film base 10. Examples of the transparent plastic films include films made of polyethylene teraphthalate, polyimide, polyether sulfone, polyether ether ketone, polycarbonate, polypropylene, polyamide, acrylamide, cellulose propionate, and the like.

Moreover, it is preferable that etching treatments such as sputtering corona discharge, flame, ultraviolet irradiation, electron ray irradiation, chemical reaction, oxidation, and the like or hydrophilic treatments such as primer coating awe given to the surface of film base 10. If such treatments are given to the surface, the adhesion to the antistatic coating 20 can be further increased.

Furthermore, the surface of film base 10 may also be dust removed or cleaned by solvent washing, ultrasonic washing, or the like as necessary before the antistatic coating 20.

The antistatic coating 20 is a membrane formed from an antistatic coating material as described above, and the membrane functions as a hard coat layer. Accordingly, as described above, the surface hardness (pencil hardness) of this antistatic coat 20 is preferably HB or harder. The total light transmittance (JIS Z 8701) of antistatic coating 20 is preferably 85% or above, more preferably 90% or above, and especially preferably 96% or above for optical purposes. The haze (JIS K 6714) is preferably 5% or below, more preferably 3% or below, and especially preferably 1% or below.

The antireflecting layer 30 is a layer for preventing the reflection of light. This layer may be a single layer or a multilayer. In case of a single layer, the refractive index is preferably in a range of 1.38 to 1.45 and the thickness of optical film is preferably in a range of 80 to 100 nm.

The antireflecting layer 30 can be formed by either dry processes or wet processes. Examples of dry processes include physical deposition processes such as electron-beam vapor deposition process, dielectric heating vapor deposition pros resistance healing vapor deposition process, sputtering process, ion plating process, and the like, and plasma CVD process. When the antireflecting layer 30 is formed by the dry processes, for example, inorganic compounds such as silicon oxide, magnesium fluoride, niobium oxide, titanium oxide, tantalum oxide, aluminum oxide, zirconium oxide, indium oxide, tin oxide, and the like can be used as component of the antireflecting layer 30.

As wet processes, for example, processes wherein a coating containing hardenable compounds is applied by well-known methods such as comma coating, spray coating, roll coating, gravure printing, and the like are given. When the antireflecting layer 30 is formed by the wet processes for example, fluorine compounds such as fluorine-containing organic compounds, fluorine-containing organosilicon compounds, fluorine-containing inorganic compounds, and the like can be used as a hardenable compound.

In the optical filter 1, an antifouling layer may be further provided on the antireflecting layer 30. If the antifouling layer is provided, it prevents the adherence of dust and dirt or facilitates to remove dust and dirt even if they adhere to.

The antifouling layer is not specially limited if it does not hinder the antireflection function of the antireflecting layer 30, can show high water repellence and high oil repellence, and prevent the adherence of contaminants. The antifouling layer may be a layer made of organic compounds or a layer made of inorganic compounds. For example, a layer containing organosilicon compounds with a perfluorosilane group or a fluorocycloalkyl group, or a layer containing organofluorine compounds can be used.

The processes for forming the antifouling lay can be properly selected according to their kinds, for example, physical vapor deposition processes or chemical vapor deposition processes such as deposition process, sputtering process, ion plating process; vacuum processes such as plasma polymerization process; microgravure process, screen coating press, dip coating process, and the like can be adopted.

The optical filter 1 described above is excellent in transparency and also excellent in adhesion to the film base 10 because the antistatic costing 20 protecting the film base 10 is formed and the antistatic coating 20 is formed from the above antistatic coating materials. Moreover, this optical filter 1 is a filter excellent in stability of antistatic property and its surface is hard to be adhered by dust.

Then, such an optical filter 1 is suitably used as an antireflecting film, an infrared absorption film, an electromagnetic wave absorption film, and the lice for liquid crystal displays and plasma displays.

Moreover, the optical filter of the present invention is not limited to the above-mentioned embodiment examples, if the optical filter has an antistatic coating formed from the above antistatic coating materials.

For example, a polarizing plate can also be used in place of the film base. For example, a polarizing plate is obtained by laminating protein films on one side or both sides of a polyvinyl alcohol resin film in which a dichromic colorant is absorbed and oriented. As dichromic colorants, iodine, dichromic dyes can be used. Such an optical filter can be provided at the uppermost surface of a liquid crystal display.

(Optical Information Recording Medium)

An embodiment example of an optical information recording medium of the present invention is explained.

Figure 2:
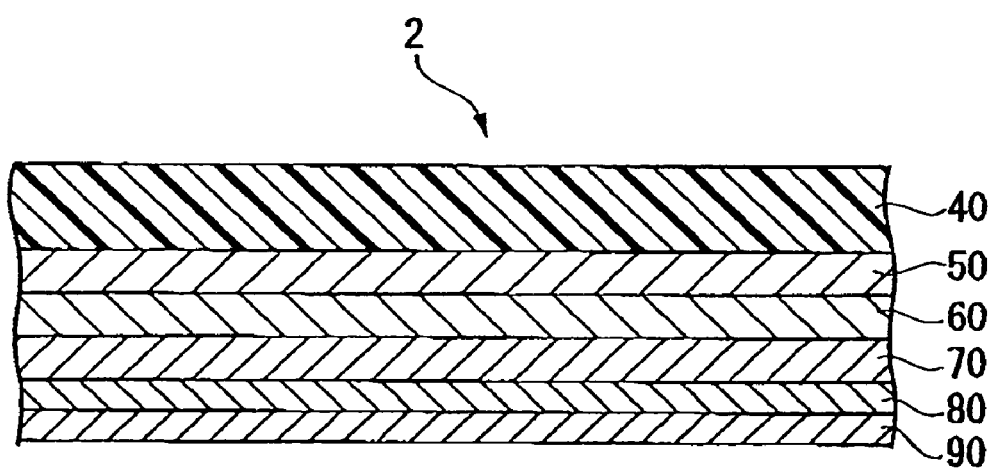
FIG. 2 is a cross-sectional view showing an embodiment of the optical information recording medium according to the present invention.

The optical information recording medium of this embodiment example is shown in FIG. 2. This optical information recording medium 2 is a rewrite-type disk and has a structure in which a disk-like transparent resin base 40, a first dielectric layer 50, an optical information recording layer 60, a second dielectric layer 70, a metal reflecting layer 80, and an antistatic coating 90 are formed in order.

As materials constructing the first dielectric layer 50 and the second dielectric layer 70, for example, inorganic materials such as SiN, SiO, $SiO_2$, $Ta_2O_5$, or the like can be used. These dielectric layers are formed in a thickness of 10 to 500 nm by well-known means such as vacuum vapor deposition process, sputtering process, ion plating process, and the like As materials constructing the optical information recording layer 60, for example, inorganic photomagnetic recording materials such as Tb—Fe, Tb—Fe—Co, Dy—Fe—Co, Tb—Dy—Fe—Co, and the like; inorganic phase change record materials such as TeOx, Te—Ge, Sn—Te—Ge, Bi—Te—Ge, Sb—Te—Ge, Pb—Sn—Te, Tl—In—Se, and the like; and organic colorants such as cyanine colorant polymethine colorants, phthalocyanine colorants, merocyanine colorants, azulene colorants, squalium colorants, and the like are used.

When the optical information recording layer 60 is made of inorganic photomagnetic recording materials, it can be formed in a thickness of 10 to 999 nm by well-known means such as vacuum vapor deposition process, sputtering process, ion plating process, and the like. When the optical information recording layer 60 is made of organic colorants, a solution given by dissolving an organic colorant in a solvent such as acetone, diacetone alcohol, ethanol, methanol, and the like can be formed in a thickness of 10 to 999 nm by well-known printing process or coating process.

The metal reflecting layer 80 exhibits light reflectivity and is composed of metals such as Al, Cr, Ni, Ag, Au, and the like and oxides thereof, nitrides thereof, and the like separately or by combining two or more kinds of them. This metal reflecting layer 80 is formed in a thickness 2 to 200 nm by sputtering or vacuum deposition process.

The antistatic coating 90 is formed from the above antistatic coating materials. Since the surface hardness of the antistatic coating 90 is set to HB or harder, the antistatic coating 90 can prevent surface scratch of the optical information recording medium 2 and prevent oxidation of the metal reflecting layer 80 as well as the adherence of dust due to static electricity.

The thickness of antistatic coating 90 is preferably 3 to 15 μm. If the thickness is thinner than 3 μm, the formation of a uniform membrane tends to become difficult, sufficient antistatic property, surface scratch resistance and oxidation resistance of the metal reflecting layer 80 sometimes cannot be displayed. On the other hand, if the thickness is thicker than 15 μm, it is feared that the internal stress increases and mechanical properties of the optical information recording medium 2 deteriorate.

The antistatic coating 90 is formed by applying an antic coating material on the metal reflecting layer 80 by well-known methods such as comma coating, spray coating, roll coating, gravure printing, and the like, and then drying the solvent or curing by heat or UV irradiation.

In the optical information recording medium 2 explained above, the antistatic coating 90 protecting the optical information recording layer 60 and the metal reflecting layer 80 is formed, and the antistatic coating 90 is formed from the above antistatic coating material. Accordingly, the antistatic coating 90 is excellent in transparency in the range of 780 nm and 635 nm which is a range of wavelength of read-only laser because the haze is low and the light transmittance is high. Moreover, the dust adherence due to static electricity is suppressed and the recording reading errors and writing errors are prevented because the antistatic coating 90 has the antistatic property.

Moreover, the optical information recording medium of the preset invention is not limited to the above-mentioned embodiment example, the optical information recording medium may also be a postscript-type disk. For example, the postscript-type disk has a structure in which a transparent resin base (organic base), an optical information recording layer, a reflecting metal layer and an antistatic coating are formed in older.

(Capacitor)

An embodiment example of a capacitor of the present invention and its production method is explained.

Figure 3:
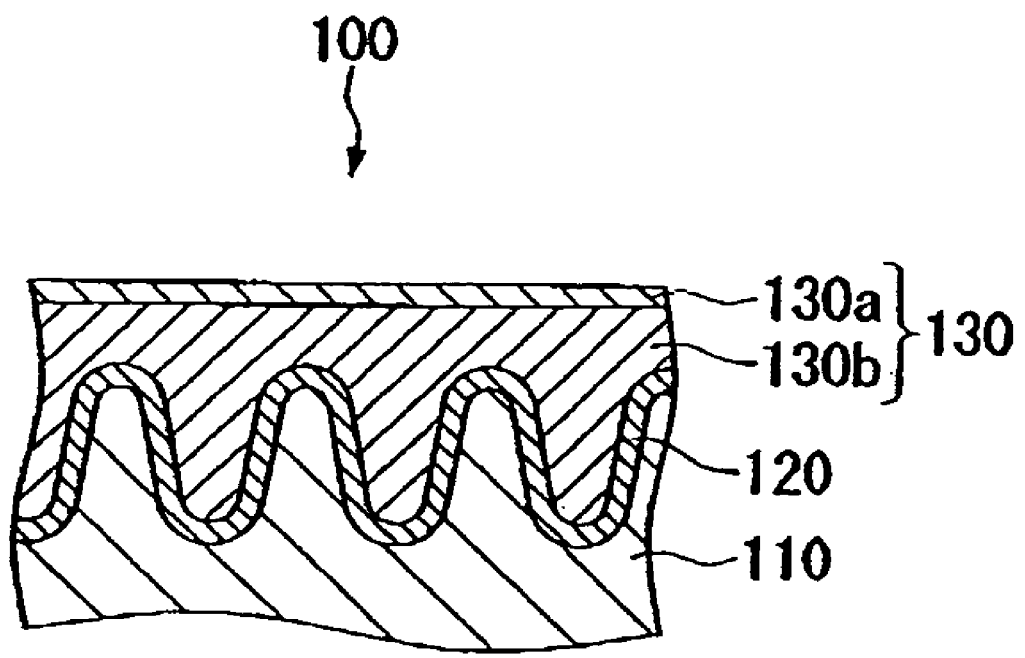
FIG. 3 is a cross-sectional view showing an embodiment of the capacitor according to the present invention.

FIG. 3 is a diagram showing the construction of a capacitor of this embodiment example. This capacitor 100 is schematically constructed by having an anode 110 composed of a valve metal porous body, a dielectric lays 120 formed by oxidizing the surface of anode 110, and a cathode formed on the dielectric layer 120.

<Anode>

Examples of valve metals forming the anode 110 include aluminum, tantalum, niobium, titanium, hafnium, zirconium, zinc, tungsten, bismuth, antimony, and the like. Among these, aluminum, tantalum, and niobium are preferably used. These valve metals can form a densely and durable dielectric oxide film (dielectric layer) by electrolytic oxidation; therefore, the capacity of capacitor can be stably increased.

As specific examples of anode 110, an anode obtained by etching an aluminum foil to increase the surface area and then oxidizing its surface, an anode obtained by oxidizing the surface of sintered body of tantalum particles or niobium particles and then forming pellets, and the like are given. The irregularities are formed on the surface of anodes thus treated.

<Dielectric Layer>

The dielectric layer 120 is formed, for example, by anodic oxidation of the surface of meal body 110 in an electrolyte such as an aqueous solution of ammonium adipate. Accordingly, as shown in FIG. 3, the irregularities are similarly formed at the surface of the dielectric layer 120 as the anode 110.

<Cathode>

A cathode 130 comprises a solid electrolyte layer 130a and a conductive layer 130b composed of carbon, silver, aluminum, and the like and formed on the solid electrolyte layer 130a. The solid electrolyte layer 130a is a layer formed by crosslinking complexes of a π conjugated conductive polymer and a dopant composed of a polyanion.

When the conductive layer 130b is constructed of carbon, silver, and the like, it is formed from a conductive paste containing a conductor such as carbon, silver, and the like. When the conductive layer 130b is constructed of aluminum, it is formed from an aluminum foil.

Moreover, a separator can be provided between the solid electrolyte layer 130a and the conductive layer 130b as necessary.

In the above-mentioned capacitor 100, the cathode 130 comprises the solid electrolyte layer 130a formed by crosslinking complexes of a π conjugated conductive polymer and a polyanion dopant with a complex crosslinking site forming compound. In this solid electrolyte layer 130a, the intermolecular distance of complexes from each other is shortened by crosslinking the π conjugated conductive polymer and the polyanion dopant via the crosslinking site forming compound. Therefore, the hopping energy necessary for the mutual electric conduction of π conjugated conductive polymer molecules reduces. As a result, the conductivity of solid electrolyte layer 130a increases, and the ESR of capacitor decreases.

(Production Method of Capacitor)

A production method of the capacitor is a method wherein a conductive polymer solution is applied to the surface of a dielectric layer 120 of a capacitor intermediate having the anode 110 composed of a valve metal porous body and the dielectric layer 120 of an oxide film formed by oxidizing the surface of the anode 110 to form the solid electrolyte layer 130a.

The conductive polymer solution in this production method contains a π conjugated conductive polymer, a polyanion, a crosslinking site forming compound, and a solvent.

To prepare the conductive polymer solution, first, the polyanion dopant is dissolved in a solvent which can dissolve the polyanion dopant, a precursor monomer such as aniline, pyrrole, thiophene, and the like forming the π conjugated conductive polymer is added into the obtained solution. Next, an oxidant is added to polymerize the precursor monomer, subsequently, excess oxidant and precursor monomer are separated and purified. Then, the crosslinking site forming compound is added to obtain the conductive polymer solution.

Solvents contained in the conductive polymer solution are not specially limited, examples of solvents include alcohol solvents such as methanol, ethanol, isopropanol (IPA), and the like; amide solvents such as N-methylpyrrolidone (NMP), dimethylacetamide (DMAc), dimethylformamide (DMF), and the like; ketone solvents such as methyl ethyl ketone (MEK), acetone, cyclohexanes and the like; ester solvents such as ethyl acetate, butyl acetate, and the like; toluene, xylene, water, and the like. They may be used separately or used by mixing. Water and alcohol solvents with a low environmental load are preferable among them from a recent viewpoint of environmental protection.

Examples of coating methods of the conductive polymer solution include well-known methods such as coating, dipping, say, and the like. Examples of drying methods include well-known methods such as hot-air drying, and the like.

After the solid electrolyte layer 130a is formed, the conductive layer 130b can be formed by well-known methods such as a method using a carbon paste or silver paste and a method providing the cathode at the opposed side via a separator.

In the solid electrolyte layer 130a, since the particle diameter of the π conjugated conductive polymer is large, the π conjugated conductive polymer does not reach to the deepest part of fine voids at the surface of dielectric layer of the capacitor intermediate product, sometimes it becomes difficult to derive a capacity. Therefore, it is preferable that the capacity is supplemented by impregnating an electrolyte as necessary after the solid electrolyte layer 130a is formed.

(Electrolytes)

Electrolytes are not specially limited if they have a high conductivity, and well-known electrolytes are dissolved in well-known solvents.

Examples of solvents in the electrolytes include alcohol solvents such as ethylene glycol, diethylene glycol propylene glycol, 1,4-butanediol, glycerin, and the like; lactone solvents such as γ-butyrolactone, γ-valerolactone, δ-valerolactone, and the like; amide solvents such as N-methylformamide, N,N-dimethylformamide, N-methylacetamide, N-methylpyrrolidinone, and the like; nitrile solvents such as acetonitrile, 3-methoxypropionitrile, and the like; water and the like.

Examples of the electrolytes include electrolytes with organic acids such as adipic acid, glutaric acid, succinic acid, benzoic acid, isophthalic acid, phthalic acid, terephthalic acid, maleic acid, toluic acid, enanthic acid, malonic acid, formic acid, decane dicarboxylic acids such as 1,6-decane dicarboxylic acid, 5,6-decane dicarboxylic acid, and the like, octane dicarboxylic acids such as 1,7-octane dicarboxylic acid, and the like, azelaic acid, sebacic acid, and the like, or inorganic acids such as boric acid, polyalcohol complexes of boric acid obtained from boric acid and polyalcohols, phosphoric acid, carbonic acid, silicic acid, and the like as anion component, and primary amines (methylamine, ethylamine, propylamine, butylamine, ethylenediamine, and the like), secondary amines (dimethylamine, diethylamine, dipropylamine, methylethylamine, diphenylamine, and the like), tertiary amines (trimethylamine, triethylamine, tripropylamine, triphenylamine, 1,8-diazabicyclo(5,4,0)-undecene-7, and the like), tetraalkylammoniums (tetramethylammonium, tetraethylammonium, tetrapropylammonium, tetrabutylammonium methyltriethylammonium, dimethyldiethylammonium, and the like), and the like as cation component.

The above-mentioned production method has simple processes, is suited to mass production, and is lowest because the solid electrolyte layer is formed by coating a conductive polymer solution and then drying.

A π conjugated conductive polymer and a polyanion dopant form a salt, and residual anion groups of the polyanion dopant not used in the formation of the salt react with a crosslinking site forming compound. Then, complexes of the polyanion dopant and conductive polymer crosslink with each other by ester formation or polymerization via crosslinking sites formed by the reaction. It is considered that the intermolecular distance of complexes from each other becomes short and the complexes are collected due to this crosslinking; therefore, the activation energy involved in hopping in the electron transition among conductive polymers reduces, and the electric conductivity increases (more specifically, 100 S/cm by electric conductivity can be realized). Additionally, it is considered that the molecular density increases due to crosslinking; therefore, the heat stability, film formability, and abrasion resistance are improved.

EXAMPLES

Preparation Example 1

Preparation of Conductive Polymer Solution 1

145 g (1 mol) of sodium allyl sulfonate was dissolved in 1000 mL of ion exchange water, 1.14 g (0.005 mol) of an oxidant solution of ammonium persulfate dissolved in 10 mL of water beforehand was added dropwise for 20 min while stirring at 80° C., and the mixture was continuously stirred for additional 12 hours.

1000 mL of sulfuric acid diluted to 10% by weight was added to the obtained solution containing polyallyl sulfonic acid, about 1000 mL of solution was removed by ultrafiltration method, 2000 mL of ion exchange water was added, and about 2000 mL of solution was removed by ultrafiltration method. The above ultrafiltration operation was repeated three times. Water in the obtained solution was removed under reduced pressure to give a colorless solid of polyallyl sulfonic acid.

Subsequently, 14.2 g (0.1 mol) of 3,4-ethylenedioxythiophene and a solution obtained by dissolving 21.8 g (0.15 mot) of polyalkyl sulfonic acid in 2000 mL of ion exchange water were mixed at 20° C.

This mixed solution was kept to 20° C., 29.64 g (0.13 mol) of ammonium persulfate dissolved in 200 mL of ion exchange water and 8.0 g (0.02 mol) of an oxidation catalyst solution of ferric sulfate were slowly added while stirring, then the sure was stirred and reacted for 5 hours.

2000 mL of ion exchange water was added to the obtained solution, and about 2000 mL of solution was removed by ultrafiltration method. This operation was repeated three times.

Then, 2000 mL of ion exchange water was added to the obtained solution, and about 2000 mL of solution was removed by ultrafiltration method. This operation was reputed five times and about 1.5% by weight of a blue solution of polyallyl sulfonic acid-doped poly(3,4-ethylenedioxythiophene) was obtained. It was taken as conductive polymer solution 1.

Preparation Example 2

Preparation of Conductive Polymer Solution 2

108 g (1 mol) of sodium allyl sulfonate was dissolved in 1000 mL of ion exchange water, 1.14 g (0.005 mol) of an oxidant solution of ammonium persulfate dissolved in 10 mL of water beforehand was added dropwise for 20 min while stirring at 80° C., and the mixture was continuously stirred for additional 12 hours.

1000 mL of sulfuric acid diluted to 10% by weight was added to the obtained solution containing polyallyl sulfonic acid, about 1000 mL of solution was removed by ultrafiltration method, 2000 mL of ion exchange water was added, and about 2000 mL of solution was removed by ultrafiltration method. The above ultrafiltration operation was repeated three times. Water in the obtained solution was removed under reduced pressure to give a colorless solid of polyallyl sulfonic acid.

Subsequently, 11.4 g (0.1 mol) of 3-methoxythiophene and a solution obtained by dissolving 16.2 g (0.15 mol) of polyallyl carboxylate in 2000 mL of ion exchange water were mixed at 20° C.

This mixed solution was kept to 20° C., 29.64 g (0.13 mol) of ammonium persulfate dissolved in 200 mL of ion exchange water and 8.0 g (0.02 mol) of an oxidation catalyst solution of ferric sulfate were slowly added while stirring, then the mixture was stirred and reacted for 12 hours. 2000 mL of ion exchange water was added to the obtained reaction solution, and about 2000 mL of solution was removed by ultrafiltration method. This operation was repeated three times.

Then, 2000 mL of ion exchange water was added to the obtained solution, and about 2000 mL of solution was removed by ultrafiltration method. This operation was repeated five times, and about 1.5% by weight of a blue solution of polyallyl carboxylic acid-doped poly(3,4-methoxythiophene) was obtained. It was taken as conductive polymer solution 2.

Preparation Example 3

Preparation of Conductive Polymer Solution 3

185 g (1 mol) of sodium styrene sulfonate was dissolved in 1000 mL of ion exchange water, 1.14 g (0.005 mol) of an oxidant solution of ammonium persulfate dissolved in 10 mL of water beforehand was added dropwise for 20 min while stirring at 80° C., and the mixture was continuously stirred for additional 12 hours.

1000 mL of sulfuric acid diluted to 10% by weight was added to the obtained solution containing polystyrene sulfonic acid, about 1000 mL of solution was removed by ultrafiltration method, 2000 mL of ion exchange water was added, and about 2000 mL of solution was removed by ultrafiltration method. The above ultrafiltration operation was repeated three times. Water in the obtained solution was removed under reduced pressure to give a colorless solid of polystyrene sulfonic acid.

Subsequently, 6.6 g (0.1 mol) of pyrrole and a solution obtained by dissolving 18.5 g (0.15 mol) of polystyrene sulfonic acid in 2000 mL of ion exchange water were nixed at 20° C.

This mixed solution was kept to 20° C., 29.64 g (0.13 mol) of ammonium persulfate dissolved in 200 mL of ion exchange water and 8.0 g (0.02 mol) of an oxidation catalyst solution of ferric sulfate were slowly added while agitating, then the mix was stirred and reacted for 2 hours.

2000 mL of ion exchange water was added to the obtained reaction solution, and about 2000 mL of solution was removed by ultrafiltration method. This operation was repeated three times.

Then, 2000 mL of ion exchange water was added to the obtained solution, and about 2000 mL of solution was removed by ultrafiltration method. This operation was repeated five times and about 1.5% by weight of a blue solution of polystyrene sulfonic acid-doped polypyrrole was obtained. It was taken as conductive polymer solution 3.

Example 1

3.7 g of hydroxymethyl acrylate (5 mol eq. to polyallyl sulfonic acid) was added to 100 mL of the conductive polymer solution 1, and the mixture was uniformly dispersed to give a conductive composition solution. The obtained conductive polymer solution was uniformly coated on a glass and dried in an oven of 150° C. to form a coating film. Electric characteristics of the coating film were estimated as follows. The results are shown in Table 1.

Electric conductivity (S/cm): The electric conductivity of coating film was measured by a LORESTA (manufactured by Mitsubishi Chemical Corporation).

The retention rate of electric conductivity depending on heat (%): The electric conductivity $R_{25B}$ of coating film at a temperature of 25° C. was measured, the coating film after measurement was placed under an environment of 125° C. for 300 hours, then the coating film was returned to the temperature of 25° C. and the electric conductivity $R_{25A}$ was measured. The retention rate of electric conductivity depending on heat was calculated by the following formula.

Retention rate of electric conductivity depending on heat (%)=$100 \times R_{25A}/R_{25B}$

TABLE 1

| | Electric conductivity (S/cm) | Retention rate of electric conductivity depending on heat (%) |
|---|---|---|
| Example 1 | 870 | 73.5 |
| Example 2 | 1120 | 42.1 |
| Example 3 | 530 | 68.3 |
| Comparative Example 1 | 2.7 | 6.6 |
| Comparative Example 2 | 3.1 | 8.1 |
| Comparative Example 3 | 3.3 | 2.9 |
| Comparative Example 4 | 2.5 | 4.3 |
| Comparative Example 5 | 3.3 | 7.5 |
| Comparative Example 6 | 5.7 | 0.6 |

Example 2

5.5 g of ethylene glycol diglycidyl ether (5 mol eq. to polyallyl carboxylic acid) was added to 100 mL of the conductive polymer solution 2, and the mixture was uniformly disposed to give a conductive composition solution. Then, the electric characteristics of the coating film were similarly evaluated as Example 1. The results are shown in Table 1.

Example 3

2.1 g of 2-hydroxyethyl vinyl ether (5 mol eq. to polystyrene sulfonic acid) was added to 100 mL of the conductive polymer solution 3, and the mixture was uniformly dispersed to give a conductive composition solution. Then, the electric characterstics were similarly evaluated as Example 1. The results are shown in Table 1.

Comparative Examples 1 to 3

The electric characteristics of conductive composition solutions 1 to 3 were similarly evaluated as Example 1. The results are shown in Table 1.

Comparative Example 4

A conductive composition solution was similarly obtained as Example 1 except that 21 g of diethleneamine (5 mol eq. to polyallyl sulfonic acid) was added in place of hydroxymethyl acrylate of Example 1. Then, the electric characteristics were similarly evaluated as Embodiment Example 1. The results are shown in Table 1.

Comparative Example 5

A conductive composition solution was similarly obtained as Example 1 except that 2.5 g of isopropyl alcohol (5 mol eq. to polyallyl carboxylic acid) was added in place of ethylene glycol diglycidyl ether of Example 2. Then, the electric characteristics were similarly evaluated as Example 1. The results are shown in Table 1.

Comparative Example 6

A conductive composition solution was similarly obtained as Example 1 except that 4.3 g of glucose (5 mol eq. to polystyrene sulfonic acid) was added in place of 2-hydroxyethyl vinyl ether of Example 3. Then, the electric characteristics were similarly evaluated as Example 1. The results are shown in Table 1.

In the conductive compositions of Examples 1 to 3 containing a crosslinking site forming compound, the electric conductivity was high and a reduction of retention rate of electric conductivity depending on heat was prevented.

In contrast, in Comparative Examples 1 to 3 free of a crosslinking site forming compound, the electric conductivity did not increase and the retention rate of electric conductivity depending on heat was low.

In Comparative Example 4, a compound with an amino group was added, but the crosslinking effect was not shown by the combination of the amino group and the polyanion dopant, the electric conductivity did not increase and the retention rate of electric conductivity depending on heat was also low.

In Comparative Example 5, a compound with only one hydroxyl group in a molecule was contained in place of the crosslinking site forming compound, the electric conductivity did not increase and the retention rate of electric conductivity depending on heat was also low.

In Comparative Example 6, a compound with four hydroxyl groups was added. Since the compound had a reducing end group, it was considered to exert an effect of dedoping a salt formed by the conductive polymer and polyanion dopant. Therefore, it was considered that the electric conductivity and the retention rate of electric conductivity depending on heat were low.

Example 4

111 g of hydroxymethyl acrylate (50 mol eq. to polyallyl sulfonic acid) was added to 300 mL of the conductive polymer solution 1 prepared in Preparation Example 1, and the mixture was uniformly dispersed. Subsequently, water was removed by evaporation, trimethylolpropane triacrylate was added to prepare an antistatic coating material.

The obtained antistatic coating material was evaluated as follows. Namely, an polymerization initiator "IRGACURE" 754 (manufactured by Ciba Specialty Chemicals) was added, applied on a PET film with a comma coater, dried, curied by expose of a high-pressure mercury vapor lamp to form a 1 μm-thick antistatic coating. Then, the surface resistance value of this antistatic coating was measured by a HIRESTA manufactured by Dia Instruments Co, Ltd. with MCP-HTP16 as probe. Moreover, the visible light transmittance (JIS Z 8701), haze (JIS K 6714) were measured. The results are shown in Table 2.

TABLE 2

|  | Example 4 | Example 5 | Example 6 | Comparative Example 7 |
|---|---|---|---|---|
| Surface resistance value (Ω) | $5 \times 10^3$ | $1 \times 10^4$ | $3 \times 10^3$ | $2 \times 10^3$ |
| Visible light transmittance (%) | 98.7 | 97.1 | 94.5 | 75.4 |
| Haze (%) | 0.7 | 0.9 | 1.0 | 7.0 |

Example 5

165 g of ethylene glycol diglycidyl ether (50 mol eq. to polyallyl carboxylic acid) was added to 300 mL of the conductive polymer solution 2 prepared in Preparation Example 2, and the mixture was uniformly disk. Subsequently, water was removed by evaporation, a UV-curable urethane acrylate resin (UN-3320HA: manufactured by Negami Chemical Industrial Co., Ltd.) was added to prepare an antistatic coating material.

It was similarly evaluated as Embodiment Example 4. The results are shown in Table 2.

Example 6

63 g of 2-hydroxyethyl vinyl ether (50 mol eq. to polystyrene sulfonic acid) was added to 300 mL of the conductive polymer solution 3 prepared in Preparation Example 3, and the mixture was uniformly dispersed. Subsequently, water was removed by evaporation, tetrabromobisphenol A diglycidyl ether was added and $Al(OH)_3$ was further mixed to prepare an antistatic coating material.

It was similarly evaluated as Example 4. The results are shown in Table 2.

Comparative Example 7

15 g of ITO powder, 60 g of dimethylformamide (DMF), 75 g of ethanol and 200 g of zirconia beads were mixed, stirred for about 1-24 hours by a ball mill, subsequently the pH of the obtained ITO colloidal solution was regulated to a range of 2 to 8. This colloidal solution was diluted with a mixed solvent of methanol, ethanol, butanol, and 2-methoxyethanol, 1-methoxy-2-propanol so that the ITO concentration became 1.0 to 1.5% by weight to prepare an ITO colloidal coating solution.

The obtained ITO colloid coating solution was spin coated at a speed of 300 rpm on a hard coat layer (U-15 HA, a UV-curable urethane acrylate resin manufactured by Shin-nakamura Chemical Co., Ltd) of a PET film (film base) to form an ITO layer. Next, a silica solution was spin coated to this ITO layer at a speed of 300 rpm, heated at 100° C. for 30 minutes to give a laminate having film base/hard coat layer/ITO layer/silica layer. Then, the results of this laminate are shown in Table 2.

The antistatic coatings of Examples 4 to 6 formed by applying the antistatic coating materials containing a crosslinking site forming compound had low surface resistance value, excellent antistatic property as well as high visible light transmittance and low haze.

On the other hand, the antistatic coatings of Comparative Example 7 having the ITO layer had high surface resistance value and low antistatic property. Moreover, it had low visible light transmittance and high haze.

Example 7

The one side of a PET film (film base) with an adhesive layer and a cover film laminated on the other side was corona treated. Next, the antistatic coring material of Example 4 was applied to the corona treated side of the PET film with a comma coater. After drying, it was cured by exposure of a high-pressure mercury vapor 1 amp to form an antistatic coating which also served as a hard coat layer. Next, a solution given by adding 42.0 g of ethanol to 80 g of an ethanol dispersion of hollow silica having fine pores inside (manufactured by Catalysts & Chemicals Industries Co, Ltd.; 15.6% by weight of solid components). Subsequently, it was dried, heat treat 100° C. for 1 hour to form a 90 mm of antireflecting layer and give an optical filter.

The visible light transmittance, haze, surface resistance, pencil hardness, adhesion, and the like of the obtained optical film were evaluated.

(Measurements of Visible Light Transmittance, Haze, and Surface Resistance)

The visible light transmittance was 98.4%, haze was 0.3%, and surface resistance value was $1 \times 10^3 \Omega$.

Moreover, measurement methods were same as the measurement methods for the fic coatings.

(Pencil Hardness Test)

When a hardness at which no any scratch was found was measured at a load of 9.8 N according to JIS K 5400 with a test pencil prescribed in JIS S 6006, the pencil hardness was 3H.

(Adhesion Test)

The adhesion test was carried out according to a cross-cut adhesive tape method (JIS K 5400).

More specifically, 11 notches each in longitudinal and latitudinal directions (totally 100 square meshes were formed) were included at the surface of the antireflecting layer side of an optical filter at a spacing of 1 mm by a cutter. An adhesive tape was pasted there, then peeled off, and the number of meshes remaining on the PET film was counted. As a result, all the 100 square meshes remained in this optical filter (100/100).

Namely, this optical filter had sufficient hardness and was excellent in transparency, antistatic property and adhesion to base.

Example 8

On the disc type polycarbonate base formed by injection molding, a 300 nm of $Ta_2O_5$ layer as a first dielectric layer, a 500 nm of Tb—Fe layer as an optical information recording layer, and a 300 nm of $Ta_2O_5$ layer as a second dielectric layer were formed, and an 100 nm aluminum layer was formed as a metal reflecting layer by sputtering. Next, the antistatic coating material of Example 4 was applied on the metal reflecting layer by a comma coater, dried, then cured by exposure of a high-pressure mercury vapor lamp to form an antistatic coating which also served as a hard coat layer and give an optical information recording medium. This optical information recording medium was evaluated as follows.

(Surface Resistance Measurement, Pencil Hardness Measurement, and Adhesion Measurement)

When the surface resistance measurement, the pencil hardness measurement, and the adhesion measurement were similarly carried out as Embodiment Example 7, the surface resistance value of this optical information recording medium was $1 \times 10^3 \Omega$, the pencil hardness of the antistatic coating was 2H, and all of 100 meshes remained in the adhesion test.

(Transmittance Measurement)

The transmittance of antistatic coating at 780 nm and 635 nm that are the luminous wave-lengths of reading laser diodes of optical information recording medium were measured by a spectrophotometer. As a result, the transmittance at 780 nm was 99.2%, and the transmittance at 635 nm was 99.8%.

Namely, this optical information recording medium was excellent in transparency at 780 nm and 635 nm and also excellent in antistatic property, scratch resistance and adhesion between antistatic coating animal base.

Preparation Example 4

22.2 g of hydroxymethyl acrylate (10 mol eq. to polyallyl sulfonic acid) was added to 300 mL of conductive polymer solution 1 prepared in Preparation Example 1, and the mixture was uniformly disperse to give a conductive composition solution 1.

The obtained conductive composition solution 1 was applied onto a glass and dried in a hot-air drier of 120° C. to form a 2 μm-thick conductive film, and the electric conductivity was measured by a LORESTA (manufactured by Mitsubishi Chemical Corporation). The results are shown in Table 3.

the mixture was uniformly dispersed to give a conductive composition solution 3. Then, it was similarly evaluated as Preparation Example 4. The results are shown in Table 3.

Example 9

An anode lead terminal was connected to an etched aluminum foil (anode foil), then chemically reacted (oxidized in a 10% by weight aqueous solution of ammonium adipate to form a dielectric layer at the aluminum surface and give a capacitor intermediate.

Next, the capacitor intermediate product and an opposite aluminum cathode foil welded with a cathode lead terminal were laminated, and the laminate was wound and taken as a capacitor element. At this time, a separator was inserted between the anode foil and the cathode foil of the capacitor intermediate.

A capacitor element was dipped in the conductive composition solution 1 prepared in Preparation Example 4 and then dried with a hot-air dryer of 120° C. to form a solid electrolyte layer at the surface of capacitor intermediate product on the dielectric side.

Subsequently, the capacitor element with formed solid electrolyte layer and an electrolyte which was a solution of 20% by weight of ammonium hydrogen adipate and 80% by weight of ethylene glycol were packed in an aluminum case and sealed with a sealing gum to prepare a capacitor.

The electrostatic capacity at 120 Hz, the initial value of equivalent series resistance (ESR) at 100 kHz and the ESR after 125° C. and 500 hours of the prepared capacitor were measured by LCZ meter 2345 (manufactured by NF Corporation).

Example 10

A capacitor was similarly prepared as Example 9 except that conductive composition solution 2 was used in place of conductive composition solution 1, and it was similarly evaluated as Example 9. The results are shown in Table 3.

Example 11

A capacitor was similarly prepared as Example 9 except that conductive composition solution 3 was used in place of

TABLE 3

| | | Example 9 | Example 10 | Example 11 | Example 12 | Example 13 |
|---|---|---|---|---|---|---|
| Electrostatic capacity (μF) | | 48.8 | 45.9 | 47.2 | 49.7 | 47.1 |
| Electric Conductivity (S/cm) | | 780 | 680 | 750 | 780 | 680 |
| ESR | Initial | 3 | 5 | 4 | 2 | 4 |
| (mΩ) | 125° C., 500 hr | 6 | 7 | 7 | 5 | 6 |

Preparation Example 5

33 g of ethylene glycol diglycidyl ether (10 mol eq. to polyallyl carboxylic acid) was added to 300 mL of conductive polymer solution 2 prepared in Preparation Example 2, and the mixture was uniformly dispersed to give a conductive composition solution 2. Then, it was similarly evaluated as Preparation Example 4. The results are shown in Table 3.

Preparation Example 6

12.6 g of 2-hydroxyethyl vinyl ether (10 mol eq. to polystyrene sulfonic acid) was added to 300 mL of conductive polymer solution 3 prepared in Preparation Example 3, and conductive composition solution 1, and it was similarly evaluated as Example 9. The results are shown in Table 3.

Example 12

An anode lead terminal was connected to an etched aluminum foil (anode foil), then chemically reacted (oxidized) in a 10% by weight aqueous solution of ammonium adipate to form a dielectric layer at the aluminum surface and give a capacitor intermediate product.

Next, the capacitor intermediate was dipped in the conductive composition solution 1 prepared in Preparation Example 4 and then dried with a hot-air dryer of 120° C. to form a solid electrolyte layer at the surface of capacitor intermediate product on the dielectric side.

Subsequently, a carbon paste was applied onto the formed solid electrolyte layer and dried with a hot-air dryer of 120° C., then a silver paste was further applied to form a conductive layer and dried with a hot-air dryer of 120° C. to form a cathode.

A lead terminal was mounted to the cathode, then wound and taken as a capacitor element. At this time, a separator was inserted between the anode foil and the cathode foil of the capacitor intermediate product.

The capacitor element with formed solid electrolyte layer was packed in an aluminum case and sealed with a sealing gum to prepare a capacitor.

The electrostatic capacity at 120 Hz, the initial value of equivalent series resistance (ESR) at 100 kHz and the ESR after 125° C. and 500 hours of prepared capacitor were measured by LCZ meter 2345 (manufactured by NF Corporation).

Example 13

A capacitor was similarly prepared as Example 12 except that conductive composition solution 2 was used in place of conductive composition solution 1, and it was similarly evaluated as Example 12. The results are shown in Table 3.

Comparative Example 8

A capacitor was similarly prepared as Example 9 except that hydroxymethyl acrylate was not added in the preparation of conductive composition solution 1, of Preparation example 4, and it was similarly evaluated as Example 9. The results are shown in Table 4.

Comparative Example 9

A capacitor was similarly prepared as Example 10 except that ethylene glycol diglycidyl ether was not added in the preparation of conductive composition solution 2 of Preparation example 5, and it was similarly evaluated as Example 9. The results are shown in Table 4.

Comparative Example 10

A capacitor was similarly prepared as Example 11 except that 2-hydroxyethyl vinyl ether was not added in the preparation of conductive composition solution 3 of Preparation example 6, and it was similarly evaluated as Example 9. The results are shown in Table 4.

TABLE 4

|  | Comparative Example 8 | Comparative Example 9 | Comparative Example 10 |
|---|---|---|---|
| Electrostatic capacity (μF) | 45.7 | 46.7 | 46.2 |
| Electric conductivity (S/cm) | 4 | 2 | 3 |
| ESR (mΩ) Initial | 50 | 60 | 55 |
| 125° C., 500 hr | 550 | 673 | 634 |

The capacitors of Examples 9 to 11 in which the solid electrolyte layer of cathode was formed by crosslinking complexes of a π conjugated conductive polymer and a polyanion dopant had excellent conductivity of cathode and low equivalent series resistance.

In contrast, the capacitors of Comparative Examples 8 to 10 in which the solid electrolyte layer of cathode was not formed by crosslinking complexes of a π conjugated conductive polymer and a polyanion dopant had low conductivity of cathode and high equivalent series resistance.

Applications of the conductive composition of the present invention to various fields requiring the conductivity, such as conductive coating, antistatic agent, electromagnetic wave shielding agent, conductive material requiting transparency, battery material, capacitor material, conductive adhesive, sensor, electronic device material, semiconductor material, semiconductive material, electrostatic copying member, photosensitive member of printing, and the like, transfer body, intermediate point transfer body, conveying member, electrophotographic material, and the like can be expected.

The antistatic coating material of the present invention enables to prepare an antistatic coating having high conductivity, flexibility and adhesion base at a low cost because the antistatic coating can be formed by a simple method such as coating, and the like and display sufficient antistatic property in a small amount.

The capacitor of the present invention has low equivalent series resistance (ESR) and can be manufactured by a simple method.

What is claimed is:

1. A conductive composition, comprising:
    a π conjugated conductive polymer;
    a dopant composed of a polyanion; and
    at least one crosslinking site forming compound selected from the following (a) and (b),
    wherein the polyanion is at least one selected from the group consisting of: substituted or unsubstituted polyalkylenes, substituted or unsubstituted polyalkylenes, substituted or unsubstituted polyimides, substituted or unsubstituted polyamides, and substituted or unsubstituted polyesters, in which substituent is at least one selected from the group consisting of: alkyl, hydroxyl, amino, carboxyl, cyano, phenyl, phenol, ester, and alkoxyl groups,
    (a) Compounds having a glycidyl group,
    (b) Compounds having a hydroxyl group and one selected from the group consisting of allyl, vinyl ether, methacryl, acryl, methacrylamide, and acrylamide groups.

2. A conductive composition according to claim 1, wherein the polyanion is at least one selected from the group consisting of: polyvinyl sulfonic acid, polystyrene sulfonic acid, polyallyl sulfonic acid, polyethyl acrylate sulfonic acid, polybutyl acrylate sulfonic acid, polyacryl sulfonic acid, polymethacryl sulfonic acid, poly-2-acrylamide-2-methylpropane sulfonic acid, polyisoprene sulfonic acid, polyvinyl carboxylic acid, polystyrene carboxylic acid, polyallyl carboxylic acid, polyacryl carboxylic acid, polymethacryl carboxylic acid, poly-2-acrylamide-2-methylpropane carboxylic acid, polyisoprene carboxylic acid, and polyacrylic acid.

3. A production method of a conductive composition, comprising:
    forming complexes which combine a π conjugated conductive polymer and a dopant composed of a polyanion; and
    adding at least one crosslinking site forming compound selected from the following (a), (b) to the complexes,
    wherein the polyanion is at least one selected from the group consisting of: substituted or unsubstituted polyalkylenes, substituted or unsubstituted polyalkylenes, substituted or unsubstituted polyimides, substituted or unsubstituted polyamides, and substituted or unsubstituted polyesters, in which substituent is at least one selected from the group consisting of: alkyl, hydroxyl, amino, carboxyl, cyano, phenyl, phenol, ester, and alkoxyl groups,
(a) Compounds having a glycidyl group,
(b) Compounds having a hydroxyl group and one selected from the group consisting of allyl, vinyl ether, methacryl, acryl, methacrylamide, and acrylamide groups.

4. A production method of a conductive composition according to claim 3,
wherein the polyanion is at least one selected from the group consisting of: polyvinyl sulfonic acid, polystyrene sulfonic acid, polyallyl sulfonic acid, polyethyl acrylate sulfonic acid, polybutyl acrylate sulfonic acid, polyacryl sulfonic acid, polymethacryl sulfonic acid, poly-2-acrylamide-2-methylpropane sulfonic acid, polyisoprene sulfonic acid, polyvinyl carboxylic acid, polystyrene carboxylic acid, polyallyl carboxylic acid, polyacryl carboxylic acid, polymethacryl carboxylic acid, poly-2-acrylamide-2-methylpropane carboxylic acid, polyisoprene carboxylic acid, and polyacrylic acid.

* * * * *

UNITED STATES PATENT AND TRADEMARK OFFICE
CERTIFICATE OF CORRECTION

| | |
|---|---|
| PATENT NO. | : 7,683,109 B2 |
| APPLICATION NO. | : 11/231689 |
| DATED | : March 23, 2010 |
| INVENTOR(S) | : Kazuyoshi Yoshida, Tailu Ning and Yasushi Masahiro |

It is certified that error appears in the above-identified patent and that said Letters Patent is hereby corrected as shown below:

Column 9, line 45 - line 47

"For example, the polyanions are substituted or unsubstituted polyalkylenes, substituted or unsubstituted polyalkylenes,..." should read --For example, the polyanions are substituted or unsubstituted polyalkylenes, substituted or unsubstituted polyalkenylenes,...--.

Claim 1, Column 36, line 32 - line 33

"group consisting of: substituted or unsubstituted polyalkylenes, substituted or unsubstituted polyalkylenes,..." should read --group consisting of: substituted or unsubstituted polyalkylenes, substituted or unsubstituted polyalkenylenes...--.

Claim 3, Column 36, line 63 - line 64

"group consisting of: substituted or unsubstituted polyalkylenes, substituted or unsubstituted polyalkylenes,..." should read --group consisting of: substituted or unsubstituted polyalkylenes, substituted or unsubstituted polyalkenylenes...--.

Signed and Sealed this
Seventeenth Day of May, 2011

David J. Kappos
*Director of the United States Patent and Trademark Office*